(12) United States Patent
Gardner et al.

(10) Patent No.: US 8,246,873 B1
(45) Date of Patent: Aug. 21, 2012

(54) METHOD AND SYSTEM FOR MANUFACTURING FOAMED POLYOLEFIN TAPES AT COST EFFECTIVE LINE SPEEDS

(75) Inventors: Hugh C. Gardner, Roswell, GA (US); Josef Uesbeck, Gronau (DE); Andy Rakovac, Gronau (DE); Philippe Combier, Chattanooga, TN (US); Kam Lui, Chattanooga, TN (US)

(73) Assignee: Propex Operating Company, LLC, Chattanooga, TN (US)

( * ) Notice: Subject to any disclaimer, the term of this patent is extended or adjusted under 35 U.S.C. 154(b) by 818 days.

(21) Appl. No.: 12/263,264

(22) Filed: Oct. 31, 2008

Related U.S. Application Data

(60) Provisional application No. 60/984,564, filed on Nov. 1, 2007.

(51) Int. Cl.
   *C08J 9/06* (2006.01)
(52) U.S. Cl. ............ 264/54; 264/51; 264/146; 264/147; 264/210.1; 264/210.6; 264/211.13; 264/211.14; 264/237
(58) Field of Classification Search .................... 264/51, 264/54, 146, 147, 210.1, 210.6, 211.13, 211.14, 264/237
See application file for complete search history.

(56) References Cited

U.S. PATENT DOCUMENTS

| | | | |
|---|---|---|---|
| 4,029,612 A * | 6/1977 | Collington | 521/79 |
| 4,482,595 A | 11/1984 | Fujishita et al. | |
| 4,572,740 A | 2/1986 | Kretzschmann et al. | |
| 4,612,229 A * | 9/1986 | Vittone et al. | 428/155 |
| 4,810,570 A * | 3/1989 | Rutten et al. | 428/318.6 |
| 5,180,751 A * | 1/1993 | Park et al. | 521/51 |
| 5,272,236 A | 12/1993 | Lai et al. | |
| 6,245,266 B1 * | 6/2001 | Ramesh et al. | 264/51 |
| 2006/0009603 A1 * | 1/2006 | Young et al. | 526/348.1 |
| 2008/0160275 A1 * | 7/2008 | Tadros | 428/220 |

OTHER PUBLICATIONS

D. Dixon, P.J. Martin and E. Harkin-Jones, Predicting the Performance of Chemical Blowing Agents Using Thermal Analysis Techniques, Journal of Cellular Plastics, vol. 36, Jul. 2000, pp. 310-326.

* cited by examiner

*Primary Examiner* — Christina Johnson
*Assistant Examiner* — Saeed Huda
(74) *Attorney, Agent, or Firm* — Husch Blackwell LLP

(57) ABSTRACT

Making foamed polyolefin tapes can include combining a polyolefin resin and a chemical blowing agent to form a mixture. This mixture can then be heated in an extruder to create a supersaturated solution of gas within the polyolefin resin. A cooling device can be positioned adjacent to a die at a set distance for receiving extruded resin and for allowing exposure of the extruded resin to ambient air between a die outlet and the cooling device. This predetermined distance or space between the cooling device and die outlet allows bubbles to grow in the extruded resin and to be shaped such that voids or empty spaces can be generated within the extruded polyolefin resin. The voids or empty spaces allow the formation of tapes which use less material but have adequate strength for various applications, such as for carpet backings, geotextiles, packaging, housewrap, bags, wire insulation, and reinforcement elements in concrete.

23 Claims, 12 Drawing Sheets

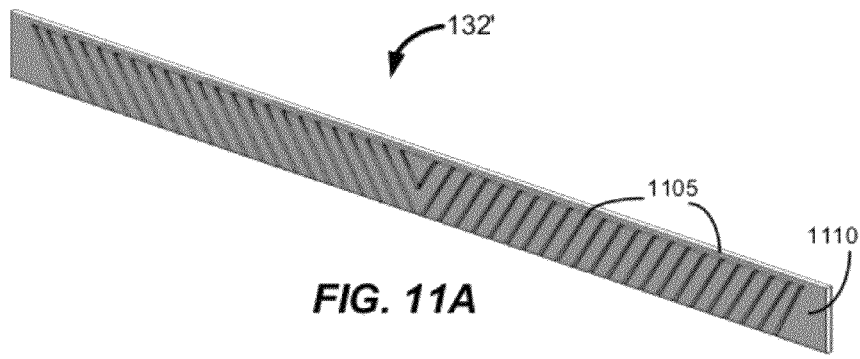
FIG. 11A
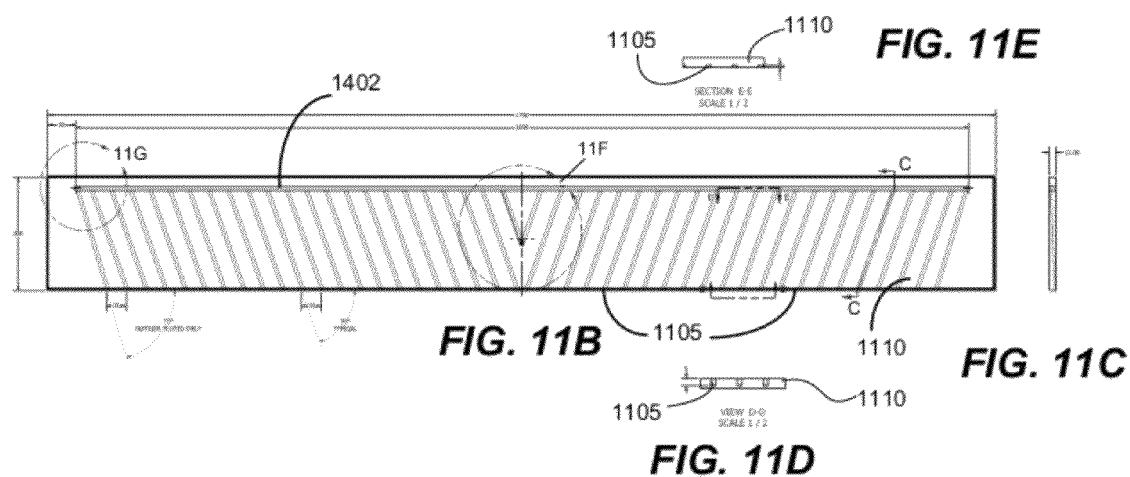
FIG. 11E
FIG. 11B
FIG. 11D
FIG. 11C
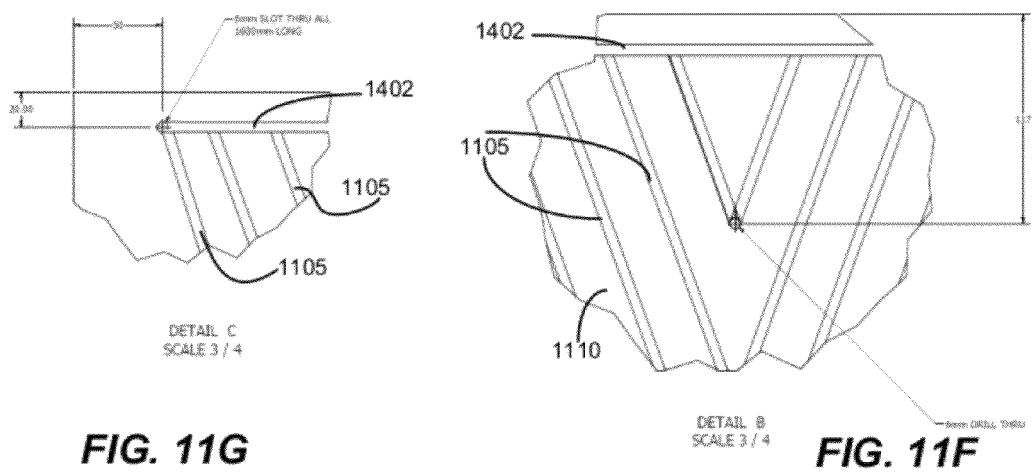
FIG. 11G
FIG. 11F

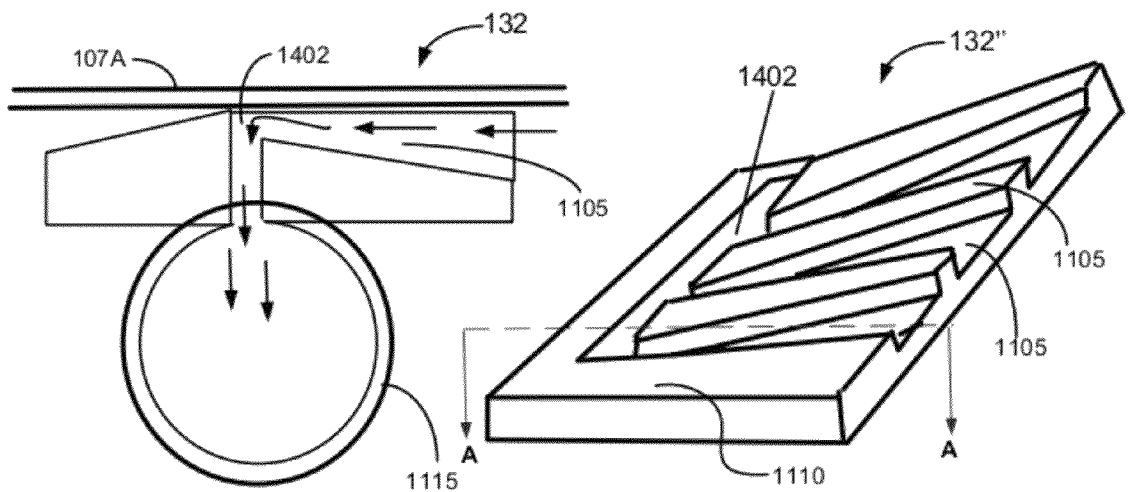
FIG. 12
FIG. 13
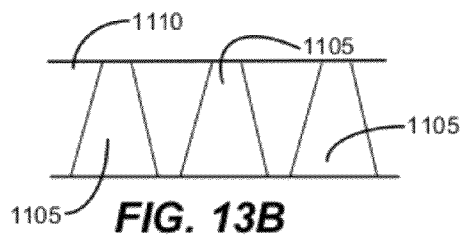
FIG. 13B
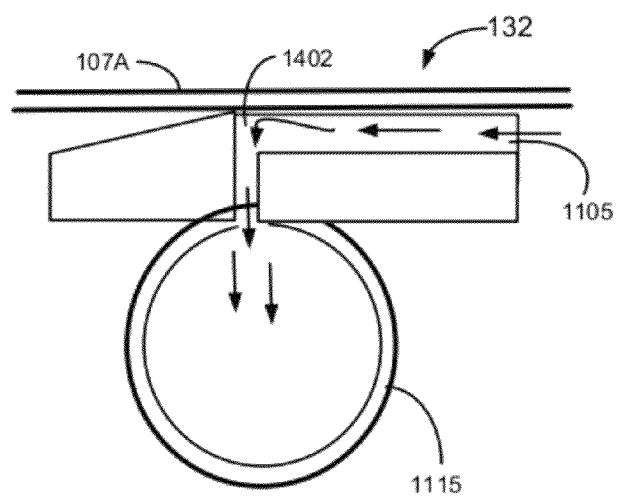
FIG. 13A

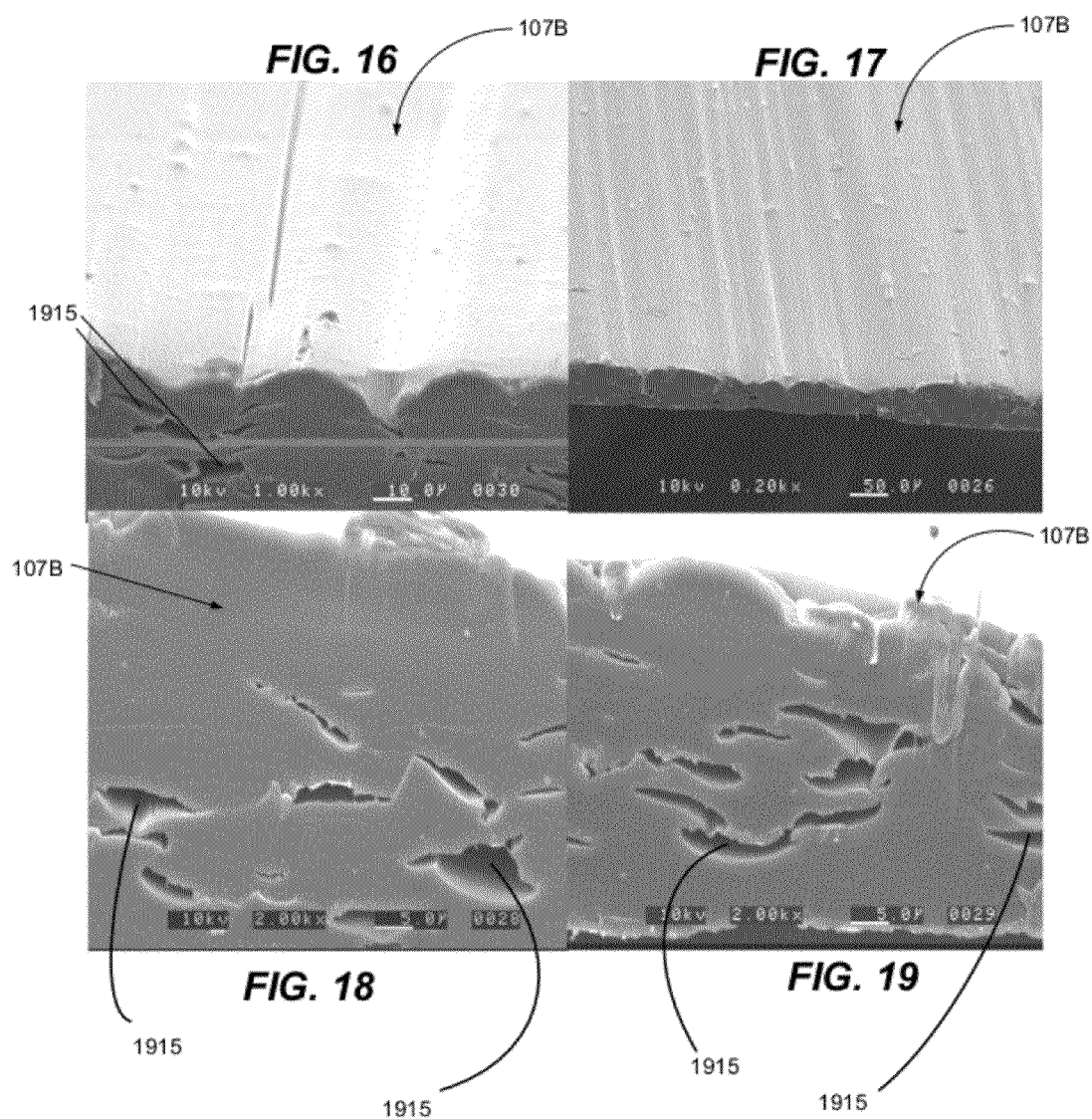

METHOD AND SYSTEM FOR MANUFACTURING FOAMED POLYOLEFIN TAPES AT COST EFFECTIVE LINE SPEEDS

STATEMENT REGARDING RELATED APPLICATIONS

The present application claims priority to provisional patent application entitled, "Method and System for Manufacturing Foamed Polyolefin Tapes at Cost Effective Line Speeds," filed on Nov. 1, 2007 and assigned U.S. Application Ser. No. 60/984,564, the entire contents of which are hereby incorporated by reference.

FIELD OF INVENTION

This invention generally relates to foamed, oriented tape yarns used in carpet backing, geotextiles, packaging, housewrap, and similar applications. More particularly, the invention relates to a high speed process for producing foamed, oriented polyolefin tapes for such applications.

BACKGROUND OF THE INVENTION

Oriented polyolefin tape yarns are commonly used in woven fabrics for applications such as carpet backing, geotextiles for soil stabilization and separation, and in coated fabrics such as housewrap, lumber wrap, and laminates for flexible packaging applications. In all these applications, the foamed, oriented tapes impart high strength and stiffness to the fabrics, and depending on the application, other essential properties. Foamed oriented tape yarns are also used as wire insulation and as crack arrestors in concrete.

Carpets

In the past, jute cloth was used as carpet backing for tufted carpets. More recently, woven fabrics of polypropylene tape yarns have been used for carpet backings.

Tufted carpets can be produced by a two-step process involving 1) stitching pile yarns made from synthetic or natural fibers through the primary backing then 2) fixing the stitches on the underside of the primary backing with a latex adhesive.

Tufted primary backings may have pile yarns that are loops, cut pile, or combinations of cut and loop pile. During the carpet manufacturing process, a second fabric, called the secondary backing may also be used. The latter fabric is laminated to the opposite side of the adhesive layer and contacts the floor. The secondary backing adds dimensional stability to the finished carpet. Typically the secondary backing is a woven fabric with tape yarns in the warp direction and spun yarns in the cross machine (or filling) direction.

Foamed Tapes for Carpet Backings

It is well known in the conventional art that polyolefin resins can be used as the stock materials for forming tape yarns for woven carpet backings. Specifically, it has been found that foamed, oriented polypropylene tape yarns can be used as the stock materials for woven backings. Such foamed tape yarns have ridged surfaces and internal voids. They typically contain less material than ordinary polypropylene tape yarns which are not formed by foaming methods. In addition to weighing less than conventional (unfoamed), oriented tape yarns, foamed, oriented tape yarns for primary carpet backing impart improved tuftability and surface appearance to tufted carpets. In secondary backings, foamed oriented tape yarns impart similar levels of dimensional stability to the finished carpet with less material than conventional (unfoamed) tape yarns.

Geotextiles

Many geotextiles are manufactured from oriented polyolefin tapes, including woven fabrics for separation and stabilization of soil layers in roadbeds and for containing soil particles (e.g., silt) at construction sites. Polyolefin tapes are also used in retaining wall fabrics, turf reinforcement mats, ground cover fabrics, geotubes, and erosion control blankets. Polypropylene tapes are used in many of these applications.

Foamed Tapes for Geotextiles

Woven geotextiles require high strength and stiffness, and specific levels of permeability to water. Often the strength of the starting tapes is diminished when they are woven into fabrics. In general, foamed, oriented tapes lose less strength in the weaving process than conventional (unfoamed) tapes, resulting in increased fabric strengths compared to fabrics woven from unfoamed tapes with the same starting tensile properties. For applications that require woven geotextiles to act as a filter, such as silt fence, foamed tapes generally have greater dimensions than conventional (unfoamed) tapes of similar weight, allowing less fabric to create the same opening size in the filter membrane.

Packaging

Oriented polyolefin tapes are commonly used to make reinforcing scrims in flexible packaging applications, such as lumber wrap, bale packaging for cotton and synthetic staple fiber, and retail packaging of food, seeds, and other granular material. The woven scrims are often extrusion coated with a layer of polyolefin resin to create a moisture-proof barrier and increase puncture resistance, strength and stiffness.

Foamed Oriented Polyolefin Tapes in Packaging

Woven fabrics for packaging often have critical requirements such as high coverage and strong adhesion of the extrusion coating to the woven scrim. Coverage, which refers to the extent of open area in the woven fabric, depends on the widths of the tapes and count of the tapes in the warp and fill direction. Compared to woven scrims made with conventional (unfoamed) oriented tapes, woven scrims with foamed, oriented tapes can have greater coverage for equal weight (or alternatively, equal coverage with less weight) and improved adhesion. As described in more detail below, improved adhesion is a consequence of the special ridged surface structure of the foamed, oriented tapes made by the method and system of this invention.

Housewrap

Housewrap is a moisture resistant, breathable fabric applied to residential and light commercial buildings prior to the installation of the exterior finish, such as shingles, brick, or siding. One purpose of housewrap is to conserve energy by reducing air infiltration. Many housewraps consist of extrusion coated woven scrims made from oriented, polyolefin tapes. They are similar to extrusion coated scrims for packaging, but often have less coverage (more open area in the scrim). These coated fabrics are often mechanically perforated to allow water vapor to pass through. Most housewraps made with woven polyolefin reinforcement easily pass the minimum requirements for tensile strength required by industry regulations.

Foamed Oriented Polyolefin Tapes in Housewrap

Foamed, oriented tapes have sufficient strength to produce housewraps that meet industry standards. They also have a ridged surface that imparts improved adhesion of the polyolefin coating to the tapes, another important property for these products. Scrims made from foamed, oriented tapes require less resin than scrims made from similar conventional (unfoamed) tapes while still delivering fully satisfactory tensile properties to the final product.

Other Applications

Oriented polyolefin tapes are used for other applications such as netting for produce bags, open knitted fabrics for curing meat, and for wire insulation. Polyolefin tapes that are cut into 1 to 2-inch lengths are also used as crack arrestors in concrete mixtures.

Foamed Oriented Polyolefin Tapes in Other Applications

Foamed, oriented tapes for other applications, can include, but are not limited to netting applications and open knitted fabrics because foamed tapes impart sufficient strength and stiffness at lower weight than conventional, unfoamed tapes. When used as wire wrap, foamed, oriented tapes impart improved insulation properties because of their increased thickness compared to conventional (unfoamed), oriented tapes. As crack arrestors in concrete, chopped foamed tapes made by the system and process of this invention have surface characteristics that lead to improved mechanical bonding between the foamed, chopped tape and cement mixture compared to an unfoamed, chopped tape of similar length.

Limitations of Conventional Thermoplastic Foaming Processes

While the conventional art describes the advantages of foamed, oriented polypropylene tapes in the above applications, much of the conventional art does not articulate how these foamed tapes can be manufactured. Most of the conventional art only describes the mechanical properties of the end products (i.e., the tapes and woven fabrics) and fails to provide any information on a sequence of specific steps and/or processes for producing such foamed, oriented tapes. Furthermore, the surface characteristics of the foamed oriented tapes are not described.

Some of the conventional art mentions specific information on a few, isolated steps that can be used in processes for making foamed, oriented polyolefin tapes for use in primary carpet backings. However, the conventional art does not provide a complete set of steps which would allow one of ordinary skill in the art to produce repeatable and accurate results for manufacturing foamed, oriented polyolefin tapes for carpet backings. Specifically, the conventional art does not provide discrete steps that describe how to manufacture foamed, oriented polyolefin tapes economically and efficiently at high line speeds, such as speeds at or above 850 feet per minute. For efficient production, the number of end breaks in the process must be low—preferably less than about 5% per hour and more preferably less than about 2% per hour.

The conventional art also mentions the use of certain equipment for making foamed polyolefin profiles, such as fence posts, moldings, and sheets for thermoforming. FIG. 1A shows a high density foam exiting a die 106 and expanding into a shaping device or calibrator 106B. The purpose of the calibrator 106B is to fix the dimensions of the expanding foam profile at it cools. While this is needed for thick section parts, it is very difficult to implement with thin sheets for tapes that are produced at faster extrusion speeds, since the opening (interior height dimension) within the calibrator for thin sheets would be very small, leading to frequent clogging and tearing of the foam sheet.

In conventional art, a set of stack smooth rolls (not shown) is sometimes used to control the thickness and smoothness of an extruded foam sheet. Since foaming processes with stacked rolls are typically run at lower extrusion speeds than the tapes of this invention and are designed to create a smooth surface on the cooled foamed sheet, they are also not well suited for making the tapes of this invention, which have a unique surface structure.

FIG. 1B shows another method for making foamed, thick section profiles. In FIG. 1B, the foamable resin 107 is spun into filaments through a spinneret die 220. The extruded filaments coalesce into a thick section that is further shaped by a calibrator 106C. The calibrator creates a smooth surface on the coalesced filaments. In the method of this invention, a smooth surface is not required or desired. Consequently, the conventional processes of shaping a foamable extrudate, either by a calibrator or stack of smooth calendar rolls do not provide much useful information about how to make the thin, foamed tapes with ridged surfaces that are the end products of the inventive method and system.

Accordingly, there is a need in the art for a method and system that describes the discrete steps and equipment that can be used to produce foamed, oriented polyolefin tape yarns for the above applications. Specifically, there is a further need in the art for a method and system that describes how such foamed, oriented polyolefin tapes can be manufactured efficiently at line speeds that allow them to be a lower cost alternative to conventional (unfoamed) tapes of similar dimensions.

SUMMARY OF THE INVENTION

A method and system for manufacturing foamed polyolefin tapes with line speeds at or in excess of 850 feet per minute can include combining a polyolefin resin and a chemical blowing agent to form a mixture. This mixture can then be heated in an extruder to create a supersaturated solution of gas within the polyolefin resin.

Pressure within the extruder containing the mixture can be applied such that the gas within the polyolefin resin mixture remains dissolved. Next, the solution can be fed through the die.

A cooling device can be positioned adjacent to an outlet of the die at a predetermined distance for receiving the extruded resin and for allowing exposure of the foamed extruded resin to ambient air during its movement through the predetermined distance between the die outlet and the cooling device. This predetermined distance or space between the cooling device and die outlet allows bubbles to grow in the extruded resin such that voids or empty spaces can be generated within the extruded polyolefin resin. This predetermined distance can be between from about 0.2 to about 6.0 inches.

According to one exemplary aspect of the inventive system and method, in addition to the predetermined spacing or distance between the cooling device and die, the time in which the extruded resin is exposed to air can be increased by using a die with a particular design. Such a die may include an area within a lip of the die allows expansion of the extruded foamed resin sheet mixture before it exits the die.

The cooling device in one exemplary embodiment can include a quenching bath in which the extruded resin is submerged in a liquid such as water. The cooling device according to another exemplary embodiment can include a chill roll. The chill roll can be maintained at a temperature much lower than that of the die and receives the extruded resin, which is allowed to contact and move with the chill roll. The chill roll can rotate at a slightly higher speed than the exit speed of the resin from the die and can transport the extruded resin to the next stage in the process. When the extruded resin contacts the chill roll, the temperature of the extruded resin changes such that its temperature is lowered.

If the cooling device used in the process includes a quenching bath, then liquid that remains on the extruded resin sheet can be removed with various mechanisms. One mechanism includes vacuum devices. Each vacuum device can be provided with a particular design such that the extruded resin sheet is spread evenly across slots of the vacuum devices. The particular design of a vacuum device can include a diverging array of grooves that originate from the entrance to the main vacuum source. The grooves can have a tapering cross-section that can accelerate the air stream and entrain more moisture so that more liquid is pulled through the slots into the vacuum device and away from the extruded resin sheet.

If a liquid quenching bath is used, another mechanism for removing water from the extruded resin sheet and pulling the sheet away from the die is a pair of nip rolls positioned above the quenching bath. At least one of the rolls in the pair is driven. Various combinations of vacuum devices and pairs of nip rolls can be used to remove liquid that may be left on the sheet from a liquid quenching bath.

Next the extruded resin can be slit into tapes. The tapes can then be heated and oriented to increase their length-wise or longitudinal dimension. The tapes are then optionally annealed, depending on their end use application. The tapes can then be taken up on individual bobbins that are present in a winder bank. At this last stage of the inventive process, the line speed is maintained in excess of 850 feet per minute. The term "line speed" refers to the take-up speed of the yarn on the bobbins in a winder bank.

The inventive method and system can produce thin, lightly foamed tape at a speed that is much higher than is used for conventional foaming processes. Typical foamed, oriented tape dimensions are about 1.0 to about 4.0 mils thick when measured according to test method ASTM 3218, and 20 to 400 mils wide. In contrast to many extruded foam profiles, the tapes of the invention are not shaped by a calibrating device such as 106B in FIG. 1A or 106C in FIG. 1B, and the foamed sheet is not passed through a stack of polished rolls while still molten, as is commonly done when a foamed sheet is produced.

With the inventive system and method, the internal void content is not typically as high as what would be calculated if all the gas resulting from decomposition of the blowing agent were allowed to form a closed cell foam. This can be attributed to the high haul off speed, rapid cooling of the foamed sheet in contact with the cooling devices, such as a quench bath or chill roll, and the high surface to volume ratio of the thin, unoriented sheet prior to quenching. The tapes can have void contents between about 20 and about 150%. At least one surface has multiple longitudinal ridges that result from expansion of the entrained gaseous decomposition products. The tapes can be produced without extreme difficulty and have very good property profiles for the various applications described above. Those applications include, but are not limited to, carpet backings, geotextiles, packaging, housewrap, netting for bags or containers, netting for food stuffs, and insulation for wires.

BRIEF DESCRIPTION OF THE DRAWINGS

FIG. 11A illustrates an isometric view of a vacuum device according to one exemplary embodiment of the invention.

FIG. 11B illustrates a plan view of the vacuum device illustrated in FIG. 11A.

FIG. 11C illustrates a cross-sectional view of the inventive vacuum device taken along the line C-C of FIG. 11B according to one exemplary embodiment of the invention.

FIG. 11D illustrates a cross-sectional view of the inventive vacuum device taken along the line D-D of FIG. 11B according to one exemplary embodiment of the invention.

FIG. 11E illustrates a cross-sectional view of the inventive vacuum device taken along the line E-E of FIG. 11B according to one exemplary embodiment of the invention.

FIG. 11F illustrates a sectional view of the vacuum device illustrated in FIG. 11B enclosed within the circle 11B according to one exemplary embodiment of the invention.

FIG. 11G illustrates a sectional view of the vacuum device illustrated in FIG. 11B enclosed within the circle 11G of FIG. 11B according to one exemplary embodiment of the invention.

FIG. 12 illustrates a side sectional view of the vacuum device of FIGS. 9-11 according to one exemplary embodiment of the invention.

FIG. 13 illustrates an isometric view of a vacuum device according to an alternative exemplary embodiment of the invention.

FIG. 13A illustrates a side sectional view of a vacuum device in addition to a conduit that contacts the extruded foamed sheet according to one exemplary embodiment of the invention.

FIG. 13B illustrates a top view of the tapered width slots of FIG. 13A according to one exemplary embodiment of the invention.

FIG. 16 illustrates a cross-sectional and top view of a foamed tape produced by the system when viewed with a scanning electron microscope according to one exemplary embodiment of the invention.

FIG. 17 illustrates a cross-sectional and top view of a foamed tape produced by the system when viewed with a scanning electron microscope according to one exemplary embodiment of the invention.

FIG. 18 illustrates a cross-sectional view of a foamed tape produced by the system when viewed with a scanning electron microscope according to one exemplary embodiment of the invention.

FIG. 19 illustrates a cross-sectional view of a foamed tape produced by the system when viewed with a scanning electron microscope according to one exemplary embodiment of the invention.

DETAILED DESCRIPTION OF EXEMPLARY EMBODIMENTS

A method and system for manufacturing foamed polyolefin tapes can include combining a polyolefin resin and a chemical blowing agent to form a mixture. This mixture can then be heated in an extruder to create a supersaturated solution of gas within the polyolefin resin. A cooling device can be positioned adjacent to an outlet of the die at a predetermined distance for receiving extruded resin and for allowing exposure of the foamed extruded resin to ambient air during its movement through the predetermined distance between the die outlet and the cooling device. This predetermined distance or space between the cooling device and die outlet allows bubbles to grow in the extruded resin and to be shaped such that voids or empty spaces can be generated within the extruded polyolefin resin. The voids or empty spaces allow the formation of tapes which use less material but have adequate strength for various applications, such as carpet backings, geotextiles, packaging, housewrap, bags, wire insulation, and reinforcement elements in concrete.

Figure 2C:
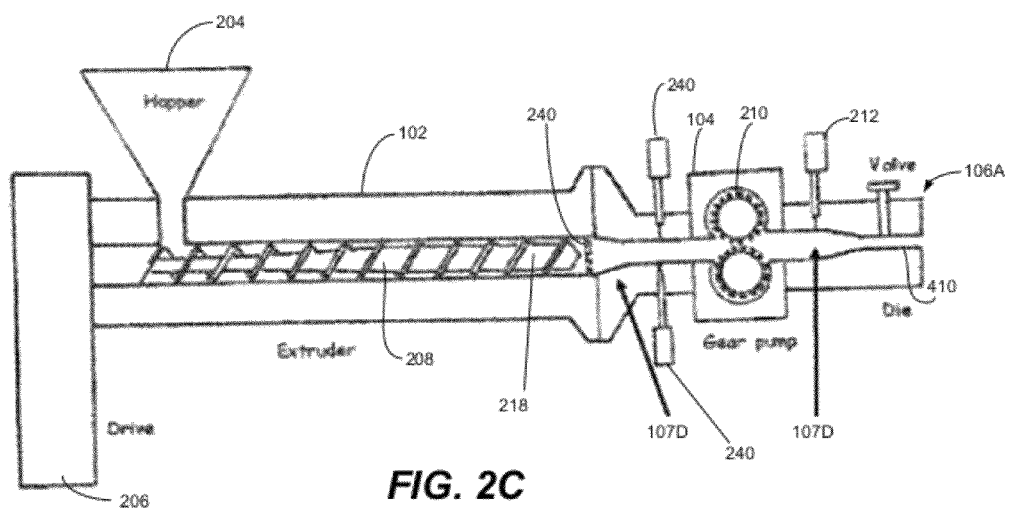
FIG. 2C illustrates further details of an exemplary high-density foam extruder system and gear pump that can be employed in the systems of FIGS. 1A and 1B according to one exemplary embodiment of the invention.
Figure 2A:
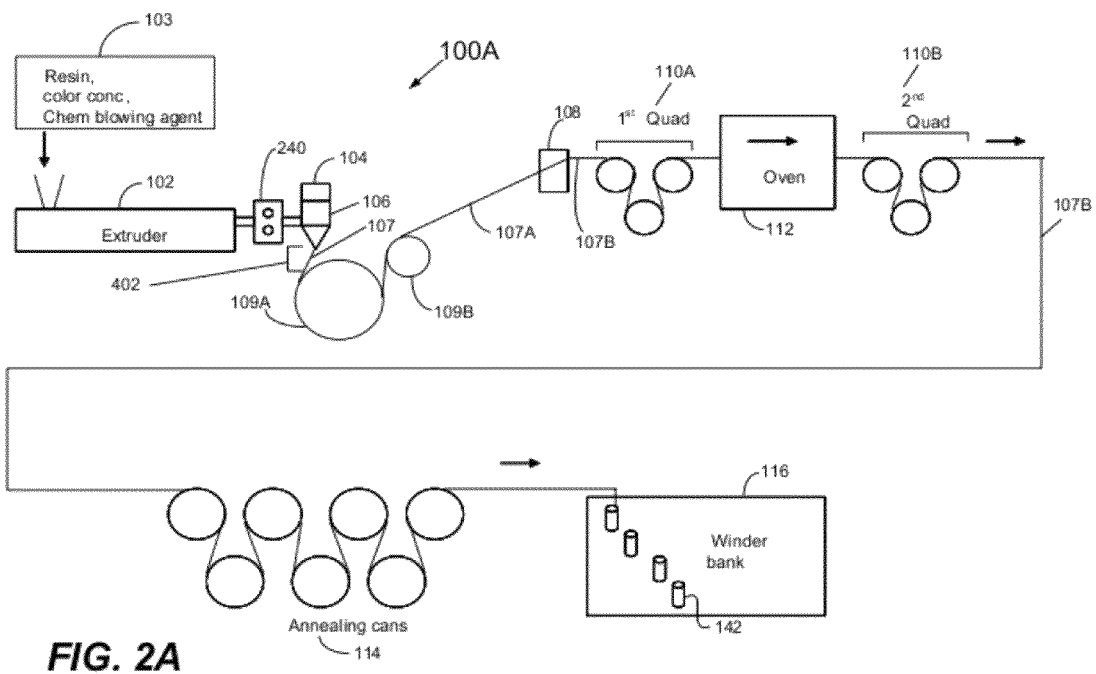
FIG. 2A illustrates one exemplary system for manufacturing foamed polyolefin tapes according to one exemplary embodiment of the invention.

Referring now to FIG. 2A, this figure illustrates one exemplary system 100A for manufacturing foamed polyolefin tapes 107B with increased line speeds. This exemplary system 100A includes an extruder 102, a screen changer 240, a melt pump 104, a die 106, and chill rolls 109A, 109B separated at a predetermined distance from the die 106. In this exemplary system, the predetermined distance or space between exit of the die 106 and the first contact point on the primary chill roll 109A can comprise a gap 402 of about 2.0 to about 6.0 inches.

Reference numeral 107 used throughout the several figures will identify a foamed sheet of material prior to stabilization. Reference number 107 will typically point to the foamed sheet of material prior to any stabilization which is before the foamed material sheet leaves contact with a cooling device 109, 130, such as a chill roll system 109 and a liquid quench tank 130. Meanwhile, reference numeral 107A will identify a foamed sheet of material after stabilization which is generally after a foamed sheet of material leaves contact with a cooling device 109, 130. Reference numeral 107B will identify individual tapes which are cut or slit from the stabilized foamed sheet of material 107A. Reference numeral 107B can refer to the foamed, slit tape before or after orientation. Reference numeral 107D will identify foamed resin material prior to extrusion into the foamed sheet 107.

As noted previously, the chill rolls 109A, 109B are exemplary cooling devices for this embodiment of the inventive system. The chill rolls 109A, 109B can include a primary, larger diameter chill roll 109A and a secondary, smaller diameter roll 109B. The latter roll 109B may optionally be cooled or may simply act as a transfer roll for the cooled, foamed resin sheet 107A leaving the chill roll 109A.

From the secondary chill roll 109B (or contact roll), the extruded foamed resin sheet 107A can move into a slitter 108 in which the extruded foamed resin sheet 107A is cut into individual tapes 107B. One embodiment of the slitter 108 is a series of stationary metal blades with spacers of predetermined thickness between them. The blades extend across the sheet and cut the foamed quenched sheet 107A into tapes or ribbons 107B as they are pulled through the cutting blades of the slitter 108. Slitting is easier to carry out when the extruded foamed resin sheet 107A is not highly oriented and not fully crystallized.

Referring to FIG. 2A again and just past or subsequent to the slitter 108, the system 100A can include a first set of rollers or first quad 110A at the entrance of an oven 112 in which the tapes are heated. The first set of rollers or first quad 110A can hold the tapes 107B for orientation in the oven 112. The system 100A can include a second set of rollers or second quad 110B at the exit of the oven 112.

The ratio of the speed of the second set of rollers or second quad 110B to the speed of the first set of rollers or first quad 110A determines the extent of drawing in the oven 112. The oven 112 can heat the tapes 107B with forced air. While an oven 112 is illustrated and described, one of ordinary skill in the art recognizes that other heating devices, besides an oven 112, are within the scope of the invention.

While the tapes 107B made from the sheet 107A pass through the first and second set of rollers 110A, 110B and the oven 112, they are typically accelerated and oriented from about 4 to about 8 times their original length, wherein at the second set of rollers 110B, their speed is at or in excess of about 850 feet per minute. This orientation of the tapes 107B is one essential step for building strength and stiffness in the final tape product 107B.

The orientation step involves rapidly heating the tapes 107B in the oven 112 while simultaneously drawing them longitudinally through the first and second set of rollers 110A, 110B. The ratio of the speed of the tape 107B at the second set of rollers 110B divided by the speed at the first set of rollers 110A is called the "machine draw ratio." For conventional unfoamed tapes 107B made in this manner, the machine draw ratio is typically about 4.5× to about 9.0× depending on the desired properties in the finished, oriented tape product 107B. Usually, the machine draw ratio is about 6×. With foamed tapes 107B, the machine draw ratio is slightly lower, since internal voids can limit the extent of stretching. Exemplary tapes 107B have been made with draw ratios of about 4.5× to about 6.2×.

Other exemplary machine draw ratios are not beyond the scope of the invention, such as draw ratios on the order of about 11.5×. This amount of stretching of the tapes can be achieved with a low MFR PP base resin, addition of a high molecular weight PE resin modifier, a thick tape 107B, and an optimized die configuration Consequently, an upper limit on the machine draw ratio above about 8× can be used, especially for products other than carpet backing tapes, such as foamed, oriented tapes 107B for geotextiles, reinforcing scrims for housewrap, and chopped tapes 107B for concrete reinforcement.

As defined previously, "line speed" is the velocity at which yarn is taken up on a bobbin 142. But prior to being taken up on a bobbin 142 in a winder bank 116, the foamed tapes 107B may move from the second set of rollers 110B at the exit of the oven (i.e., $2^{nd}$ Quad) over a set of annealing cans 114, where the tapes are heated and allowed to contract. This annealing step is frequently provided for carpet backing tapes 107B and other oriented, foamed tapes 107B where resistance to shrinkage at elevated temperatures is required.

During annealing, the tapes or yarns 107B pass over heated cans 114 and begin to shrink. As the tapes 107B shrink, the speed of the oriented tapes 107B may slow down. The reduction in speed is usually called "relaxation" as known to one of ordinary skill in the art. For carpet backing yarns, the degree of relaxation is typically from about 6 to about 14%. However, other degrees of relaxation above or below this range are within the scope of the invention.

Figure 2B:
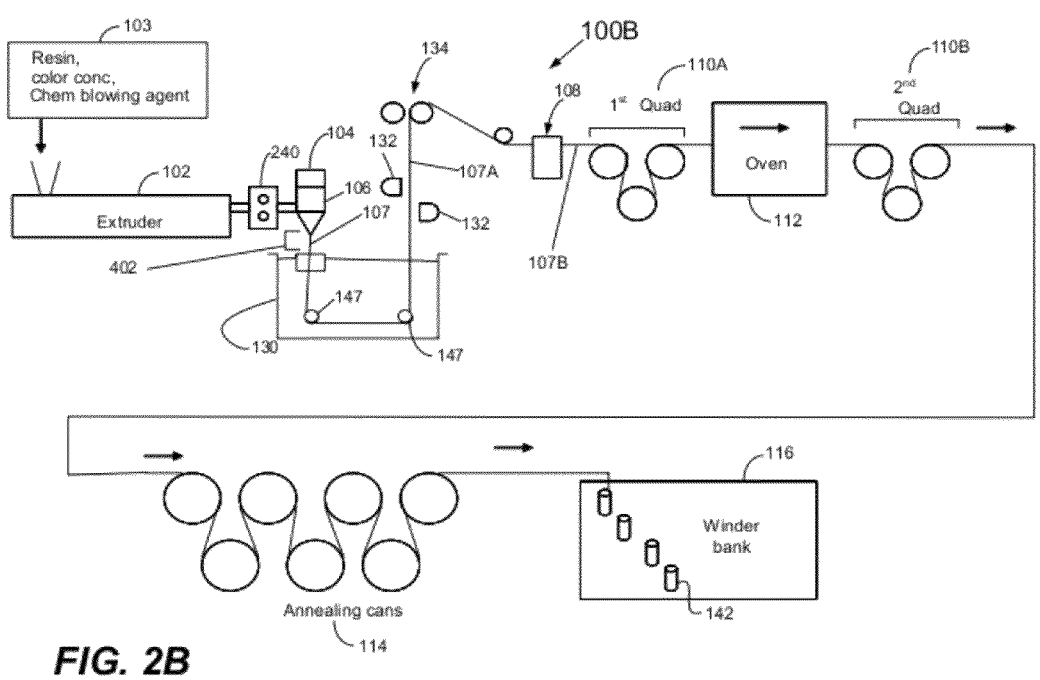
FIG. 2B illustrates another exemplary system for manufacturing foamed polyolefin tapes according to an alternate exemplary embodiment of the invention.

Usually, there can be a set of three to nine annealing cans 114 (seven cans are illustrated in FIGS. 2A and 2B). However, one of ordinary skill in the art recognizes that a fewer number or a greater number of annealing cans could be used without departing from the scope of the invention. For a nine-roll annealing can set, the first six cans 114 can heat the tapes 107B as they relax. Meanwhile, the seventh through ninth cans 114 can be used to cool the tapes 107B before they are transported to the winder bank 116.

After the annealing stage 114, the tapes 107B can be separated and wound onto individual bobbins 142 in a winder bank 116. Consequently, a yarn or tape 107B with a "line speed" of 900 fpm could arise from a yarn 107B that had a speed of 1000 fpm after orientation and 10% relaxation. If the relaxation were greater than 10% for that same yarn 107B, the speed after orientation but before relaxation would be higher than 1000 fpm. Usually, the ratio of the speed at the winders (i.e., Line speed) to the speed of the second set of rollers or second quad 110B determines the amount or percentage of relaxation.

According to an alternative exemplary embodiment of the system 100A and method (not illustrated), ribbons or tapes 107B can be formed by extruding a shaped, foamed filament and without ever forming an extruded foamed resin sheet. Consequently, in this alternative exemplary inventive process and system, the step of slitting the sheet is avoided.

According to another alternative exemplary embodiment, the slitting step can be delayed until after the foamed sheet 107A is oriented. In that process, the slitter 108 is positioned after the second roll set ($2^{nd}$ Quad) 110B and may comprise a set of mechanically driven as opposed to stationary blades.

According to another alternative exemplary embodiment (not illustrated), the orientation step on the slit tapes 107B may be carried out using one or more pairs of heated, independently driven rolls (not illustrated) that simultaneously contact the entire web of slit foamed tapes 107B. This apparatus, which is called a "short gap draw unit," can replace the forced air oven 112 in the system. Each roll pair has a short distance or gap (e.g., about 1.0 to 18.0 inches) between the rolls. In each roll pair, the speed of the second roll is higher than the first, and the overall "machine draw ratio" described for orientation of the tapes 107B is similar to that used with a forced air oven 112.

According to another alternative exemplary embodiment, the orientation step may be carried out on the foamed, extruded resin sheet 107A using the short gap draw unit. In that embodiment, slitting into tapes can be carried out subsequent to the orientation step. In this and in all other embodiments, the foamed, oriented tapes 107B may be taken up on individual bobbins 142 in a winder bank 116 in groups of one up to eight ends per bobbin 142, or the entire web may be taken up simultaneously by parallel winding on a single large spool (e.g., on a beamette—not illustrated).

Referring now to FIG. 2B, this figure illustrates a second exemplary system 100B for manufacturing foamed polyolefin tapes 107B with line speeds at or in excess of 850 feet per minute. The second exemplary system 100B is different from the exemplary system 100A illustrated in FIG. 2A in that the second exemplary system uses a quench bath 130 as the cooling device in the process instead of a chill roll 109A. And with this type of cooling device, various mechanisms, such as vacuum devices 132 and nip towers, are needed to remove excess liquid present on the extruded resin 107A after the extruded resin 107A leaves the quenching tank 130.

Many of the features of the second exemplary system are similar to those illustrated in FIG. 2A for the first exemplary system. Therefore, only the differences between the systems illustrated in FIG. 2A and FIG. 2B will be described for FIG. 2B.

In FIG. 2B, at the exit of the die 106 and at a predetermined distance from the die 106, the extruded foamable polyolefin resin 107 enters a quench tank 130 in which the extruded resin 107 is submerged in a liquid, such as water. The predetermined distance or spacing between the exit of the die 106 and the surface of the water 406 in the quench tank 130 is known as the air gap 402. In the inventive method and system, the air gap is typically between about 0.2 to about 6.0 inches, and more specifically, between about 0.5 and about 3.5 inches.

An air gap 402 at or near the high end of the typical range becomes more suitable as the speed of the process increases. The reason for this is that it takes time for the bubbles in the extruded resin 107 to form and grow. If the distance between the die 106 and surface of the liquid 406 in the quench bath 130 is too short, internal void structures and pronounced longitudinal ridges may not be obtained, reducing the potential for reduction in density in the oriented, foamed tapes 107B, and in the case of primary carpet backing fabrics made from such tapes 107B, diminishing their tufting performance. Tapes of the preferred exemplary embodiments have a ridged surface and internal voids. They are typically about 1 to about 4 mils thick.

The rate of bubble formation depends primarily on the concentration of blowing agent, solubility of the gaseous blowing agent decomposition products in the resin, number of bubble initiation sites in the resin, and resin viscosity. The predetermined distance 402 corresponds to a residence time for the extruded foamable resin 107 in ambient air of less than 0.5 seconds. During this time, the extruded foamed resin sheet 107 can be exposed to atmospheric pressure. However, there is also a minimum time that the foamable sheet 107 can be exposed to atmospheric pressure for bubble to form. For a high speed process with a line speed in excess of 850 feet per minute, the foamable resin sheet 107 exiting the die 106 will usually require at least about 0.02 seconds in the air gap 402 for bubble initiation and growth. However, other times longer or short than those described for the air gap 402 are within the scope of the invention.

Referring back to FIG. 2B, at the entrance of the quench tank 130, the low stiffness foamed extruded sheet of resin 107A is pulled through the quenching bath in the tank 130. The sheet 107A is pulled around two stationary bars 147 in the tank 130 by a driven nip station or tower 134 positioned adjacent to and above the liquid in the quench tank 130. The liquid of the quench tank 130 is usually water. However, one of ordinary skill in the art recognizes that other liquids in the quench tank 130 are possible and are within the scope of the invention.

When the extruded foamed sheet exits the quench tank 130, the bubbles in the sheet 107A usually appear as ellipsoids with the principal axis in the machine direction. The ratio of the length of the principal axis of the bubbles to that of the secondary axis is typically about 1.5 to about 6. However, other ratios lower or higher than those disclosed are within the scope of the invention. In the inventive system 100B and method, the foamed sheet 107A has primarily closed cells as it emerges from the quenching bath 130.

Under certain circumstances, the extruded foamed sheet 107 exiting the die 106 and prior to stabilization may have a few holes in at least one surface resulting from bubbles that have expanded through the thickness dimension of the sheet 107. Large bubbles, especially those that have expanded through both surfaces of the extruded sheet 107, forming a hole, are not desired since they can lead to yarn breaks in the oriented tapes that are formed later in the process. It has been observed that holes resulting from large bubbles usually appear in the extruded foamed sheet 107 under the following conditions: 1) the use of a high level of blowing agent, 2) a lower die pressure than suction pressure (this is explained in more detail below), and 3) the use of certain types of blowing agents that are known to produce large bubbles. One objective of the inventive method and system 100B is to create bubbles that are large enough to promote splitting of the tapes 107B during tufting and reduce the overall density of the tapes 107B, but not so large that they cause the tapes to break during orientation.

The speed of the nip tower 134 is proportional to the speed set for the first set of rollers or first quad 110A. The time the sheet 107 spends in the quench tank 130 is usually proportional to the speed of the nip tower 134. After being pulled through the liquid of the quench tank 130 by the nip tower 134, the extruded foamed sheet 107A then leaves the quench tank 130 and is exposed to ambient air again. At this stage, excess liquid from the quench tank 130 is usually present on the extruded foamed resin sheet 107A. This excess liquid can be removed with various mechanisms 132.

Referring to FIG. 2B again, one mechanism for removing the excess liquid at this stage (just after and above the quench tank 130) from the extruded foamed resin sheet 107A can be one or more vacuum devices 132. Exemplary vacuum devices 132 include long prismatic—beam like members that can include slots positioned along the length dimension of the vacuum device 132 for sucking up or vacuuming liquid from a surface of the extruded sheet 107A as it passes over the vacuum slot of the vacuum device 132. The inventive system 100B and method can employ vacuum devices 132 with improved designs for removing the excess liquid. Some of these improved designs of the vacuum devices 132 will be discussed below in connection with FIGS. 9-13.

Removing excess liquid from the extruded foamed resin sheet 107A is necessary to minimize yarn breaks during a subsequent orientation step. During orientation, the tapes 107B are heated as they are stretched longitudinally. If water droplets are present on a tape 107B during orientation, this can create areas that are cooler (and less drawable) than the surrounding material. These cooler sites are where fracture of the tape 107B begins.

As shown in FIG. 2B, after passing over the vacuum devices 132, the extruded resin sheet 107A is pulled through a pair of nip rolls 134. These nip rolls 134 can press the extruded resin sheet 107A on both sides in order to direct away any excess liquid remaining on the sheet 107A.

The inventive system 100B and method are not limited to the type, number, or arrangement of nip rolls of a nip tower 134 that may be employed in order to remove the excess liquid from the extruded resin sheet 107A that originates when a quench tank 130 is used as the cooling device in the system 100B. A nip tower 134 is usually designed to pull resin sheets 107A from the quench tank 130 in addition to removing any excess fluid by a squeezing or compression action. Exemplary configurations/combinations of nip towers 134 and vacuum devices 132 are described below and illustrated in FIGS. 6-8.

Referring now to FIG. 2C, this figure illustrates further details of an exemplary high-density foam extruder system 102 and gear pump 104 that can be employed in the system 100A, 100B. The extruder 102 can employ a single screw 208 which pushes the polyolefin resin while decomposing the blowing agent along the length of the screw 208.

The extruder system 102 has several heated barrel zones and can have a specially designed screw 208. The screw 208 has sections along its length for feeding, compressing, and metering the mixture. In the feeding section, such as near the hopper 204, the mixture of resin pellets, pellets of chemical blowing agent masterbatch, and other additives is heated by a combination of friction and heat supplied through the barrel wall. Melting of the resin and masterbatch pellets begins in this section. In the compression zone, the material is compacted, and remaining pellets are fully melted. Most of the chemical blowing agent decomposes into gases (typically carbon dioxide, nitrogen, and water vapor) in this section. The gases dissolve in the polymer through the shearing action of the screw 208 and high internal pressure. Without the shearing action and high internal pressure, the gases will not dissolve. The metering section 218 of the screw in FIG. 2C is for pumping the supersaturated solution into a melt pump 104 (i.e., gear pump) connected to the die 106. The melt pump 104 can adjust its throughput, such as its RPM, as needed in order to keep the thickness of the sheet 107A drawn through the die 106 fairly constant.

The section 218 of the screw 208 near the melt pump 104 is constructed so that as it rotates, pressure is maintained at a high level, and the flow is fairly uniform. The pressure at the exit of the extruder 102 can be maintained by adjusting the RPM of the screw 208.

The single screw extruders 102 of this system, system 100A, and system 100B and method typically have screws 208 with an L/D of about greater than 24. However, other L/D ratios higher or lower than this are possible and are within the scope of the invention. The screws 208 may be barrier flight screws 208, and supplemental sections (such as Maddock mixers) may be present on the screw tip. Other types of screws 208 can also be used.

One process requirement is keeping the temperature of the extruder zones near the feed throat and near the hopper 204 low enough to prevent premature decomposition of the blowing agent, since if decomposition occurs, the gases will escape out the throat rather than dissolve in the molten resin. Decomposition of chemical blowing agents occurs over a range of temperatures. The temperature range may be as large as about 80° C. For polypropylene tapes, the preferred blowing agents do not begin to decompose until they reach temperatures above about 270° F., preferably about 320° F., so that resin, which has begun to melt, can help contain the gas. Other temperatures higher and lower than those disclosed are possible. For polypropylene/chemical blowing agent mixtures, extruder processing temperatures are typically about 340° F. to about 500° F.

The phrase "in an extruder" describes the apparatus 102 where the heating and shearing is typically done. An extruder 102 can melt resin pellets and can convey the molten resin towards a die 106. However, there are other types of plastics mixers, such as co-rotating and counter-rotating twin screw compounders (not illustrated), that potentially could be used in the inventive method and process.

Without significant pressure generated by the small clearance between the screw 208 and extruder barrel illustrated in FIG. 2C, gas from the blowing agent will escape from the polymer melt. A minimum pressure must be maintained in the system to keep the gases dissolved in the polyolefin resin. Typically for polypropylene tapes of the inventive system and method, at a processing temperature of about 464° F. (240° C.), a minimum system pressure of about 1300 pounds per square inch (psi) usually must be maintained within the extruder 102 and downstream components (e.g., transfer tube, melt pump, and die). This pressure is usually about two to three times higher than the minimum pressure in the systems 100A and 100B for conventional unfoamed tapes.

If the gas comes out of solution in the extruder 102, it is very difficult to redissolve. This situation is similar to attempting to redissolve carbon dioxide in a bottle of soda once the pressure has been released. Consequently, the best approach is to keep the pressure high throughout the extruder 102 through the die 106.

In most tape extruders 102, a melt pump 104 (or Gear pump with gears 210 in FIG. 2C) is installed between the end of the screw 208 and the die 106. The melt pump 104 can insure that a very consistent flow of resin 107D, which contains dissolved gas from the blowing agent, is transferred under pressure to the die 106.

System pressures are often measured at the end of the extruder screw 208 (head pressure), at the inlet to the melt pump 104 (suction pressure), and in the die 106 (outlet pressure). For most foaming processes, the head pressure is typically highest in the process and the suction pressure is usually lowest. This is the preferred ordering of pressures for the inventive process. The inventive process is usually much less stable when the die pressure is equal to or lower than the suction pressure. Therefore, the die pressure should preferably be higher than the suction pressure.

Figure 1A:
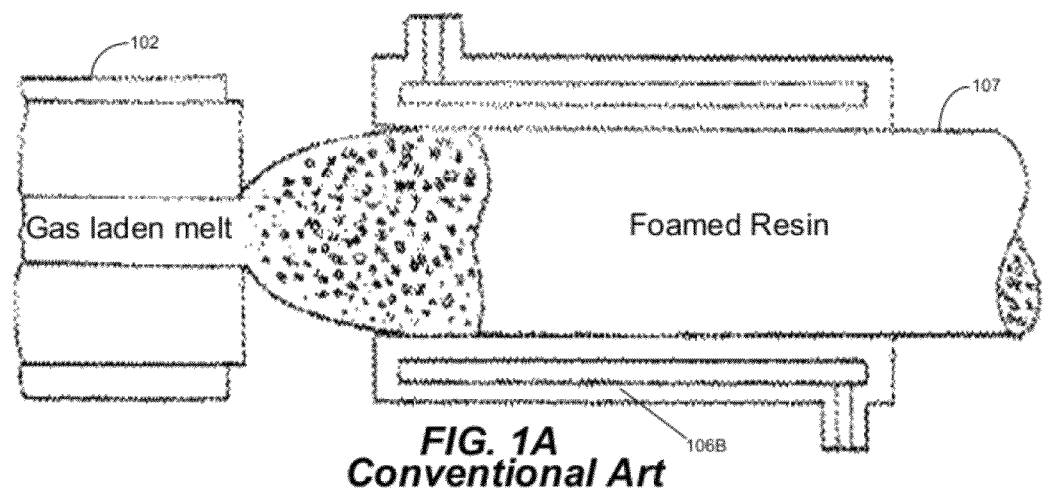
FIG. 1A illustrates a high density foam freely expanded and shaped in a calibrator or shaping die that is commonly used with conventional foaming processes.

The die 106 typically has a narrow rectangular slot through which the supersaturated solution of gas in resin exits (see Gas—saturated melt of FIG. 1A). The die 106 is usually built to withstand high pressures (e.g., such as up to 8000 psi) and is heated. The area adjacent to the exit of the die is called the lip. The narrow section of the lip is called the land 410 (see also FIG. 5 below). The land 410 may be flat or grooved (serrated). For most foaming processes, the land 410 is very short (e.g., ¼") to minimize the pressure drop through the narrow section. For the dies 106 in the inventive system 100A, 100B, the land 410 is typically about 1" long.

This one-inch length for the land 410 typically works, but is usually not ideal for high speed processes. Land lengths of about ¾" or less are preferable for the inventive system and method.

In contrast to sheet dies, some dies have many small openings through which individual tapes 107B may be extruded. While not illustrated, such dies for forming single tapes 107B instead of one large sheet may be used in the inventive system 100A, 100B and method.

Referring again to FIG. 2C, the supersaturated solution 107D in the extruder 208 and melt pump 104 must be transferred to the die 106. This transfer is done under pressure. For most extrusion lines, a melt pump 104 (Gear pump in FIG. 2C) serves this purpose, since along-the-length uniformity is a key product requirement. A melt pump 104 (Gear pump in FIG. 2C) usually comprises a series of intermeshing gears 210 that deliver a constant volume of material with each revolution of the gears. The speed of the melt pump 104 is one of the controls for the inventive system and method. For unfoamed tape yarn made from a specific resin, denier is typically determined primarily by four factors: (1) the melt pump setting (which determines resin throughput at the die exit), (2) the speed of the nip roll at the exit from the quench bath, (3) the spacing between cutter blades in the slitter, and (4) the machine draw ratio during the orientation step. For line speeds of about 850 to about 1050 fpm with polypropylene resin, the melt pump typically has a speed of about 35 to about 55 RPM. Such melt pumps typically have a throughput of about 180 cc per revolution. However, other RPMs and throughput values are not beyond the scope of the invention, such as melt pumps with capacities of 50 to 300 cc's per revolutions, and speeds of 15 to 150 RPM.

Base Polyolefins Used in System

The polyolefin resin used in the inventive system 100A, 100B and method is preferably a polypropylene homopolymer. However, the invention is not limited to polypropylene (PP) homopolymers as the base resin and can include high density polyethylene (HDPE), linear low density polyethylene (LLDPE), and metallocene polyethylene (mPE) resins. Metallocene polyethylene resins are described in, inter alia, U.S. Pat. No. 5,272,236, the contents of which are hereby incorporated by reference.

The PP resin used as the primary resin in the inventive system 100A, 100B and method can have a melt flow rate (MFR) from about 0.2 to about 25 g/10 minutes determined according to ASTM D1238, at 230° C. and 2.16 kg. A preferred, yet exemplary range is about 0.7 to about 7 g/10 minutes.

For polyethylene resins used as the primary resin in the inventive system 100A, 100B and method, the melt index determined according to ASTM D1238, at 190° C. and 2.16 kg can be about 0.1 to about 40 g/10 minutes. Blends of polypropylene and polyethylene resins can also be used. Suitable blends include a polypropylene with a MFR of about 4.0 and a high density polyethylene resin (density=about 0.94 g/cc) with a melt index of about 0.7 in about a 92 to 8 weight ratio. Other suitable blends include 94 weight percent polypropylene (MFR of about 2 to about 4 g/10 min) and about a 6.0 weight percent linear low polyethylene (density 0.89 g/cc) with a melt index of about 0.9 g/10 min.

The inventive system 100A, 100B can use commercially available PP, HDPE, LLDPE, and mPE resins and does not require specialty resin grades designed for foam applications. However, special foamable polypropylene resins such as Basell PROFAX® 814 and Borealis Daploy® WB260HMS can be used.

One polyolefin resin useful in the extrusion of foamed resin tapes 107B according to the inventive system 100A, 100B and method will preferably comprise a substantially linear polypropylene homopolymer. The homopolymer may be syndiotactic or isotactic. However it is preferable to use an isotactic polypropylene homopolymer having an isotactic index of greater than about 0.85, more preferably greater than about 0.90, since articles obtained from said homopolymer typically have superior physical properties. Such polymers are readily prepared by a variety of polymerization processes well known in the art, including processes employing Ziegler-Natta catalysts and those based on metallocene catalysts.

Other suitable polypropylene resins for the inventive system and method may comprise copolymers having 50 wt % or more propylene monomer content. Further, the foamable propylene resin may comprise a mixture or blend of propylene homopolymers or copolymers with a homo- or copolymer other than propylene homo- or copolymers.

Particularly useful propylene copolymers are those of propylene and one or more non-propylenic monomers. Propylene copolymers include random, block, and grafted copolymers of propylene and olefin monomers selected from the group consisting of ethylene, $C_3$-$C_8$ alpha-olefins and $C_4$-$C_{10}$ dienes. Propylene copolymers may also include terpolymers of propylene and alpha-olefins selected from the group consisting of $C_3$-$C_8$ alpha-olefins, wherein the alpha-olefin content of such terpolymers is preferably less than 45 wt %. The $C_3$-$C_8$ alpha-olefins include 1-butene, isobutylene, 1-pentene, 3-methyl-1-butene, 1-hexene, 3,4-dimethyl-1-butene, 1-heptene, 3-methyl-1-hexene, and the like. Examples of $C_4$-$C_{10}$ dienes include 1,3-butadiene, 1,4-pentadiene, isoprene, 1,5-hexadiene, 2,3-dimethyl hexadiene and the like.

Minor amounts (50 percent or less by weight) of other semicrystalline polymers that may be added to the base polypropylene resin in the foamable composition include high, medium, low and linear low density polyethylene, fluoropolymers, poly(1-butene), ethylene/acrylic acid copolymer, ethylene/vinyl acetate copolymer, ethylene/propylene copolymer, styrene/butadiene copolymer, ethylene/styrene copolymer, ethylene/ethyl acrylate copolymer, ionomers and thermoplastic elastomers such as styrene/ethylene/butylene/styrene (SEBS), and ethylene/propylene/diene copolymer (EPDM).

Minor amounts (30 percent or less by weight) of amorphous polymers and modifying resins may be added to the base polypropylene resin. Suitable amorphous polymers include, e.g., polystyrenes, polycarbonates, polyacrylics, polymethacrylics and polystyrene-polyethylene copolymers. Suitable modifying resins include polyterpene resins and hydrogenated tall oil resins.

A wide variety of extrusion grade, film-forming, substantially linear polypropylene resins having an essentially monomodal molecular weight distribution and the requisite MFR are readily available in the trade, and most will be found useful for providing foamed tapes according to the teachings of this inventive system 100A, 100B and method. It is surprising and unexpected based on the known art of foamable polypropylene that commercially available polypropylene homopolymer resins with melt flow rates of about 2.0 to about 4.0 g/10 minutes would have preferred properties for making foamed tapes by the inventive system and method. Most examples in the prior art for making foamed ribbons and similar products describe the use of PP resins with lower MFR's, such as about 0.45 g/10 min.

Types of Blowing Agents Used in Inventive System

The type of blowing agent that can be used in the inventive system 100A, 100B and method can comprise a bicarbonate/citric acid agent. A preferred chemical blowing agent is Hydrocerol® HP20P sold by Clariant Masterbatch GmbH. This product, which is also known as Hydrocerol® 3034, is supplied as a masterbatch (usually with 16% active ingredients pelletized in a polyolefin carrier). The blowing agent is endothermic (absorbs heat as it decomposes) and in the bicarbonate/citric acid family. Preferred amounts of about 16% active masterbatch are typically about 0.9 to about 1.5 weight percent, depending on the extrusion system and degree of internal void formation and surface rugosity desired.

Another preferred chemical blowing agent is Hydrocerol® 8697, which is supplied by Clariant USA, Winchester, Va. This blowing agent, which can be supplied with about 12%, 16%, or 20% active ingredients, has a polyethylene carrier. The active ingredient is in the citric acid/bicarbonate family. The amount of active ingredient in Hydrocerol 8697 used for high speed processing is similar to that in Hydrocerol 3034. Another version of Hydrocerol 8697 known as Hydrocerol 3115 is also a preferred chemical blowing agent. It is also believed that the preferred blowing agents may include a citric acid ester of the type described in U.S. Pat. No. 4,572,740, the entire contents of which are hereby incorporated by reference.

Blowing agents that are variants of the HP20P blowing agent, such as Hydrocerol® 3079 are also preferred, since they may improve the performance and quality of tapes produced by the inventive method and system 100A, 100B. Variants of HP20P may contain different types and amounts of "accelerators" [e.g., calcium oxide], which change the onset temperature for and rate of decomposition. Additionally, a combination of blowing agents, such as Hydrocerol 3079 and 3034, may also be used in the inventive method and system.

Since the concentration of active ingredients in chemical blowing agents may vary over a wide range, the weight percent of chemical blowing agent masterbatch in the foamable resin mixture may also vary widely. Nevertheless, for the system and method of this invention, the weight percent of chemical agent masterbatch will be between about 0.3 and 3.0 weight percent. The critical parameter is the amount of gas generated in the resin by decomposition of the active ingredients in the chemical blowing agent.

For chemical blowing agents such as the citric acid/bicarbonate masterbatches mentioned above, the desired amount of volatiles resulting from their decomposition is typically about 30 to about 65 cubic centimeters (cc) at STP (standard temperature and pressure) per 100 grams of resin blend, and preferably about 36 to about 50 cc per 100 grams of resin blend. This amount of carbon dioxide provides both internal voids and a ridged surface on extruded tapes or shaped filaments. The void content of foamed oriented tapes made according to the system and process of this invention is typically about 2 percent to about 15 percent. For other chemical blowing agents that produce carbon dioxide on decomposition, the proportion of chemical blowing agent in the resin blend should be adjusted so that the yield of volatiles is the same as for the citric acid/bicarbonate mixtures mentioned above. With polypropylene resin systems, the preferred amount of gas generation in compositions that produce nitrogen gas instead of carbon dioxide will be slightly less than the amount produced with carbon dioxide.

Background on Chemical Blowing Agents

Chemical blowing agents are usually classified into two categories: endothermic blowing agents, which absorb heat when they decompose, and exothermic blowing agents, which liberate heat when they decompose. For some applications, an exothermic blowing agent may be more desired over endothermic blowing agents because an exothermic blowing agent has a single and sharp decomposition temperature. A comparison between the two types of blowing agents with regard to some parameters is given below. In addition to the preferred citric acid/bicarbonate based blowing agents mentioned above, other blowing agents suitable for the inventive method and system can include many of the following types used singly, or in combination.

Some of the exothermic blowing agents include the following:

(1) Azo and Diazo Compounds: Azo compounds contain aliphatic groups and are present in a number of different structures. The most common member of this class is azodicarbonamide, which decomposes in air over a narrow temperature range (205 to 215° C.). The main product of decomposition is nitrogen gas. Blowing agents of these types are used for foaming thermoplastic polymers including polyethylene, polypropylene, polystyrene, and PVC.

(2) N-Nitroso Compounds: Compounds containing the nitrosoamine group along with different organic groups fall under this group. N,N'-Dinitrosopentamethyltetramine is the most widely used blowing agent of this type. The gas liberated by this compound depends on the type of decomposition promoter used. The gaseous products mainly consist of carbon dioxide and nitrogen. The most effective decomposition temperature for this blowing agent is 160° C.

(3) Sulfonylhydrazides: Benzosulfonylhydrazide is one non-limiting example this type of blowing agent. This is a colorless and odorless compound with a decomposition temperature of 130-140° C. On decomposition, this blowing agent not only evolves nitrogen but it also leaves a residue that is a mixture of disulfide and thiosulfone.

Some of the endothermic blowing agents as well as blends of exo- and endothermic blowing agents include, but are not necessarily limited to:

(A) SAFOAM® FPE-50, endothermic blowing agent, is available in the form of pellets and is manufactured by Reedy International Corporation. The active ingredients present are encapsulated sodium bicarbonate and citric acid. The recommended peak processing temperature for this blowing agent is 158-183° C. On decomposition, it evolves carbon dioxide gas. A commercially available masterbatch is made up of 50% of the blowing agent in a polyethylene carrier. Addition levels of 0.5-2.5% have been recommended. The gas evolved by SAFOAM® FPE-50 is about 50 cc/g.

(2) EXOCEROL® CT-1210 is sometimes also referred to as enexothermal blowing agent and is available in the form of pellets. It is manufactured by Clariant Masterbatches Inc. The exothermic part of CT-1210 consists of azodicarbonamide and the endothermic part is based on a modified azodicarbonamide, sodium bicarbonate and citric acid. The recommended peak processing temperature for this blowing agent is 170-210° C. On decomposition, it evolves nitrogen and carbon dioxide gases. It contains 50% of the exothermic blowing agent and 50% endothermic blowing agent in a universal carrier. Additive levels of 0.2-2.4% have been recommended. The gases evolved by CT-1210 are in the range of 60 cc/g.

However, other types of blowing agents, such as physical blowing agents such as carbon dioxide or nitrogen gas, can be used without departing from the scope and spirit of the invention Other Components in the Foamable Resin Mixture In addition to the base resin and chemical blowing agent, the foamable resin mixture may contain other components such as masterbatch pellets of color concentrates, UV inhibitors, flame retardants, and anti-slip agents. Fluoroelastomer masterbatches such as CESA®-process PEA 1175021 available from Clariant Masterbatch GmbH and SCC 24618 from Standridge Color Corporation can be added to the resin/blowing agent mixture to enhance processability. Masterbatches containing bubble nucleators such as uncoated talc may also be used. The masterbatch SCC 23456 from Standridge Color Corporation is one such product.

Action of Blowing Agent in the Extruder

Typically, chemical blowing agents are supplied as pellets in which the blowing agent has been compounded with the carrier resin to form a masterbatch. This operation is carried out at a temperature below the decomposition of the blowing agent. Masterbatch pellets are typically blended with the polyolefin resin component at room temperature prior to introduction to the extruder 102. The same is true of pellets containing pigments and UV stabilizers. Typically the blowing agent masterbatch is separate from the masterbatches for pigments and other additives, since it must be pelletized at a lower temperature to avoid decomposition.

In the extruder 102, the blowing agent is mixed to distribute it throughout the polyolefin in undecomposed form, above the melt temperature of the polyolefin, but below the activation temperature of the chemical blowing agent. Once dispersed, the chemical blowing agent may be activated by heating the mixture to a temperature above its decomposition temperature. Decomposition of the blowing agent liberates gas, such as nitrogen, carbon dioxide, and water, yet cell formation is restrained by the temperature and pressure of the system. For polypropylene foamed tapes, useful chemical blowing agents typically decompose at a temperature of 140° C. or above.

Typically about 0.3 to about 3.0 wt % of the blowing agent masterbatch in the total resin/blowing agent composition is required for optimum processability and tape performance. Blowing agent concentration in the masterbatch is preferably about 10 to about 40 percent by weight, and most preferably about 10 to about 30 percent to allow for accurate metering into the pellet blend.

Referring back to FIG. 2C, a screen changer 240 can be placed at the end of the extruder 102 to prevent particles in the gas-saturated melted resin 107D from entering the melt pump 104 and die 106. Such particles include agglomerates from one or more of the masterbatches or carbon deposits in the extruder. This filtering stage 240 can improve the quality of the resin 107D that is extruded through the die 106. Preferred screen changers have a moving belt of wire cloth, such as those made by Key Filters (Woonsocket, R.I.), or two pistons (not illustrated) that hold screens of varying mesh sizes to filter the melt, such as those made by Kreyenborg GmbH (Munster, Germany). For single screw extruders with barrel diameters of 4.5 to 6.0 inches of this invention, the screen packs for the piston-type screen changers 240 are about 6.0 inches in diameter. A screen pack is a combination of screens of different sizes that are combined to filter the melt. In the pack, the coarse screens (such as those that are 20- or 40-mesh) provide support for the finer mesh screens. The size of particles that may be filtered out (i.e., trapped) on a screen pack is determined by the mesh of the finest screen in the pack. The finest screen in the pack is referred to as the "filtering screen." It has been determined that screen packs containing a filtering screen with openings corresponding to the open areas in 150-mesh to 250-mesh screens are preferred for the inventive system and method. The most preferred filtering screen size is 200 mesh.

Screen packs that only contain filtering screens coarser than 150-mesh do not remove particles as efficiently as screenpacks containing a filtering screen in the preferred mesh size range, while screen packs that contain a filtering screen finer than 250-mesh can create excessive extruder head pressure at the speeds required for the inventive process. While these screen sizes are appropriate for screen changers with two 6-inch pistons and resin throughputs of 300 to 1000 lbs/hr, other preferred mesh sizes for the screens 240 may be appropriate when a) larger screen changers are used or b) throughputs are above or below the stated range.

A melt pump or gear pump 104 is provided which can comprise a series of intermeshing gears 210 that deliver a constant volume of material with each revolution. The speed of the melt pump 104, as discussed above, is one of the controls for the inventive system and method.

Figure 3:
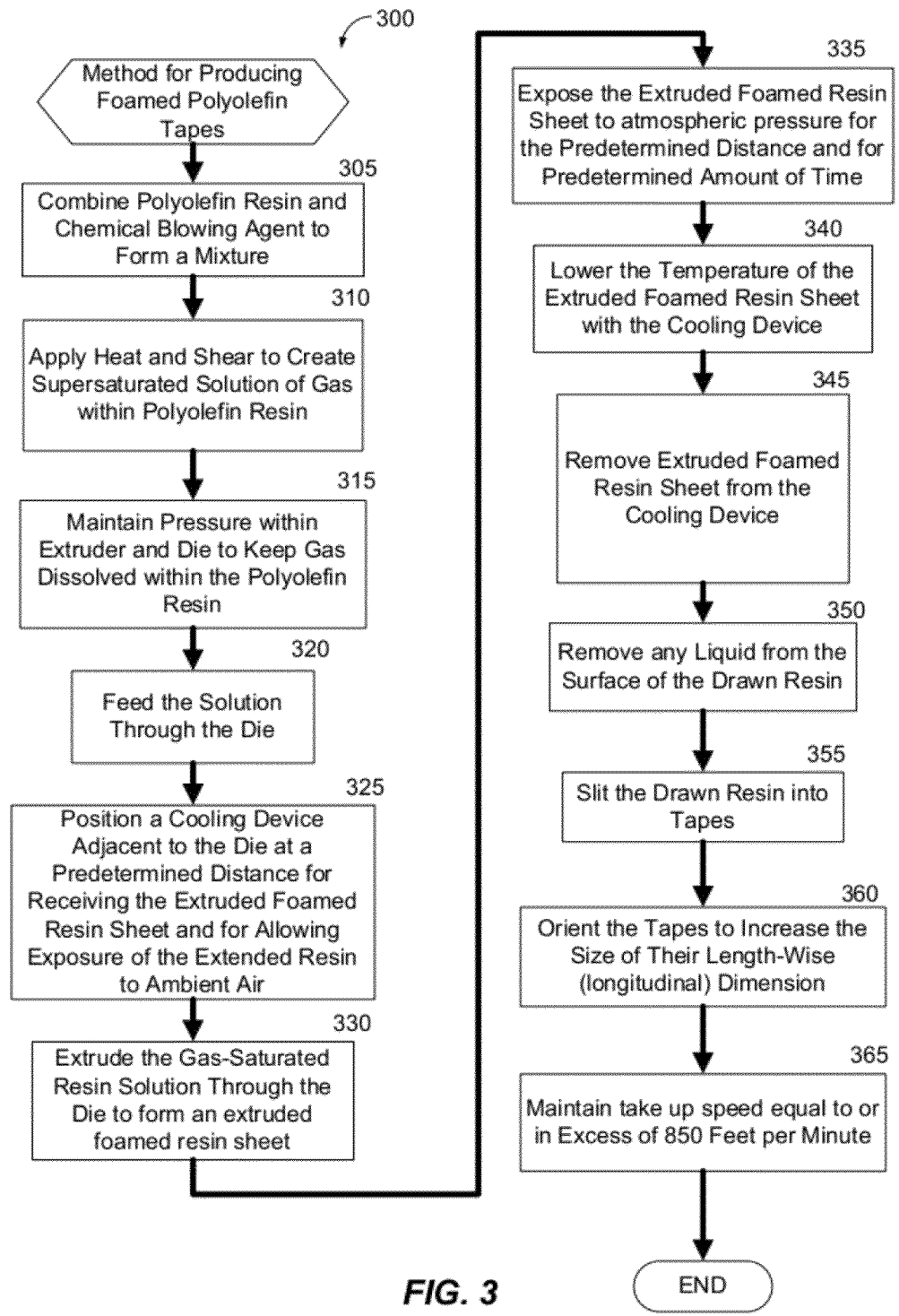
FIG. 3 illustrates an exemplary method for manufacturing foamed polyolefin tapes with increased line speeds according to one exemplary embodiment of the invention.

Referring now to FIG. 3, this figure illustrates an exemplary method for manufacturing foamed polyolefin tapes with line speeds at or in excess of about 850 feet per minute. Certain steps in the processes or process flow described in all of the logic flow diagrams referred to below must naturally precede others for the invention to function as described. However, the invention is not limited to the order or number of the steps described if such order/sequence or number does not alter the functionality of the present invention. That is, it is recognized that some steps may not be performed, while additional steps may be added, or that some steps may be performed before, after, or in parallel other steps without departing from the scope and spirit of the present invention.

FIG. 3 illustrates an exemplary method 300 for manufacturing foamed, oriented polyolefin tapes at cost effective line speeds. Step 305 is the first step of the exemplary process. In step 305, a polyolefin resin and a chemical blowing agent are combined to form a mixture. This step corresponds to the resins and additives stage 103 illustrated in FIGS. 2A and 2B, discussed above. Next, in step 310, the mixture of polyolefin resin, blowing agent, and other components, if present, are heated and subjected to the shearing action of the extruder screw turning inside the barrel to create a supersaturated solution of gas within the polyolefin resin. Step 310 corresponds with the extruder stage 102 illustrated in FIGS. 2A, 2B, and 2C.

Subsequently, in step 315 the pressure within the extruder 102 and die 106 are maintained to keep the gas from the blowing agent dissolved within the polyolefin resin. This step corresponds with the compression section of the screw 208, melt pump 104 (if present), and die sections 106 illustrated in FIGS. 2A, 2B, and 2C. In step 320, the supersaturated solution of the gas and polyolefin resin is fed through the die 106, and specifically, through the outlet of the die as illustrated in FIGS. 2A, 2B, and 2C.

In step 325, a cooling device 109, 130 is positioned adjacent to the die outlet at a predetermined distance 402 for receiving the extruded foamed resin sheet and for allowing exposure of the extruded foamed resin sheet 107 to atmospheric pressure. This step corresponds to positioning the primary chill roll 109A adjacent to the die as illustrated in FIG. 2A. This step also corresponds with positioning the quench tank 130 and the fluid 406 contained within that tank 130 adjacent to the die as illustrated in FIG. 2B.

In step 330, the gas-saturated resin solution is extruded through the die 106. This step corresponds with the outlet of the dies illustrated in FIGS. 2A, 2B, and 2C. Next, in step 335, the extruded foamed resin sheet is exposed to atmospheric pressure and ambient temperature for the predetermined distance 402 (See FIGS. 2A, 2B, 4, 14) between the outlet of the die 106 and chilling device 109, 130 and for a predetermined amount of time. This step corresponds with the predetermined distance or spacing 402 between the outlet of the die 106 and the primary chill roll 109A illustrated in FIGS. 2A and 14. This step also corresponds with the predetermined distance or spacing 402 between the outlet of the die 106 and the liquid level 406 of the quench tank 130 illustrated in FIGS. 2B and 4.

Next, in step 340, the temperature of the extruded foamed resin sheet is lowered with a cooling device 109, 130. This step corresponds with the primary chill roll 109A and secondary chill roll 109B illustrated in FIG. 2A. This step also corresponds with the quench tank 130 illustrated in FIG. 2B.

In step 345, the extruded foamed resin sheet 107A is drawn from the cooling device 109, 130. In this step the bubbles formed in the extruded foamed resin sheet 107B are shaped. This step corresponds with the movement and contact of the extruded foamed resin sheet with the chilling devices of FIGS. 2A and 2B.

In step 350, any liquid from the surface of the extruded foamed resin sheet 107A is removed. This step only corresponds with the system 100B and method illustrated in FIG. 2B. Specifically, this step corresponds with the vacuum devices 132 positioned adjacent to the extruded foamed resin sheet 107A to remove liquid from the surface of the sheet 107A that is present from the quench tank illustrated in FIG. 2B. The step also relates to the nip rollers 134 that can be used in combination with the vacuum devices 132 as illustrated in FIG. 2B. Therefore, if the chill roll 109 of FIG. 2A is used as the cooling device, then Step 350 can be eliminated or skipped.

In step 355, the extruded foamed resin sheet 107A can be slit into separate individual tapes 107B. This step generally corresponds to the slitter 108 illustrated in FIGS. 2A and 2B.

In step 360, the tapes 107B are oriented to increase the size of their length-wise or longitudinal dimension. This step occurs between the first and second sets of rollers 100A, 110B positioned at the entrance and exit of the oven 112 (i.e., $1^{st}$ Quad and $2^{nd}$ Quad 110A, 110B) as illustrated in FIGS. 2A and 2B.

Figure 1B:
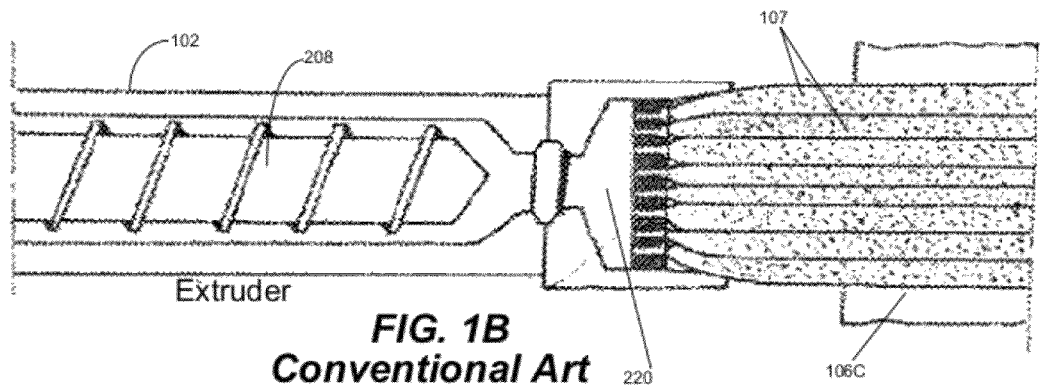
FIG. 1B illustrates a foamed resin produced using a spinnerette die at the exit of an extruder in combination with a calibrator or shaping die that is commonly used with conventional foaming processes.

In step 365, a take up speed in excess of about 850 feet per minute is maintained. As noted previously, the term "line speed" refers to the take-up speed at winders 142 in which the tapes 107B are wound on bobbins 142 in a winder bank as illustrated in FIGS. 1A and 1B. A preferred line speed includes those in excess of about 900 feet per minute. But higher line speeds, such as 1100 feet per minute, may be desirable depending on the finished tape product that is being produced by the inventive system 100A, 100B and method. After step 365, the inventive process can end or the entire process can be re-started.

Between steps 360 and 365, the tapes 107B may optionally be annealed. In this step, the tapes 107B contract as they pass over a series of heated cans or rollers 114. This step is required for carpet backing tapes and may be used also for tapes for housewrap and packaging applications. However, for other applications such as geotextiles, this additional annealing stage or step may be skipped or eliminated.

Figure 4:
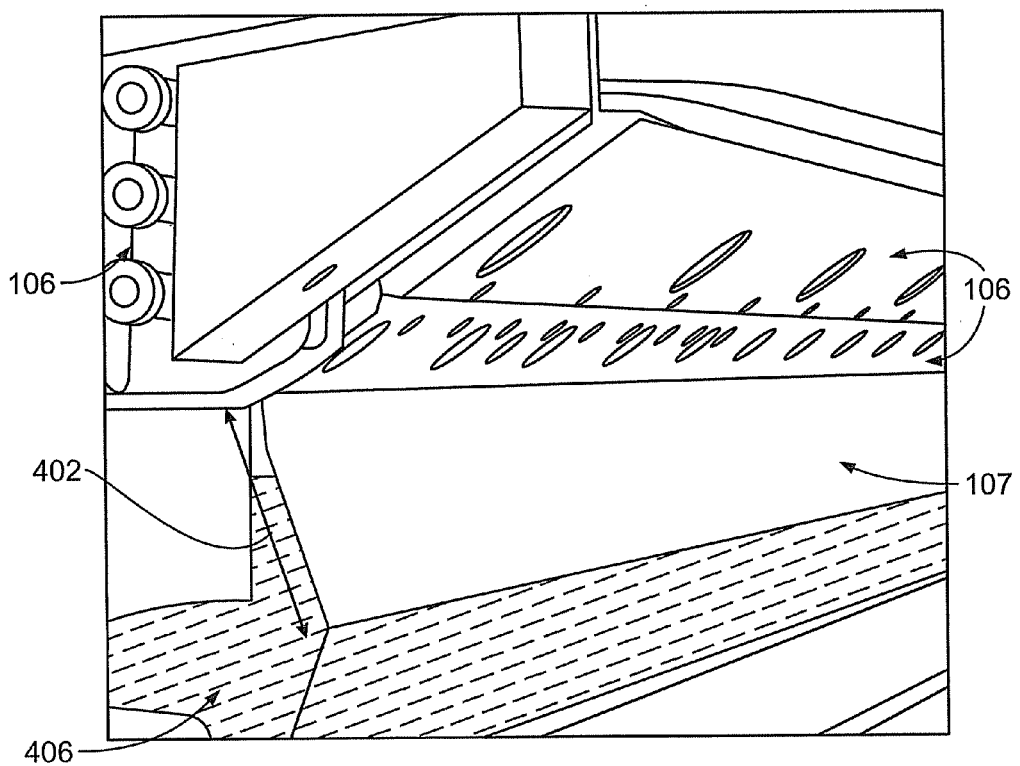
FIG. 4 illustrates an extruded resin sheet that exits a die and is drawn into a quench tank filled with a liquid, such as water, according to one exemplary embodiment of the invention.

Referring now to FIG. 4, this figure illustrates an extruded resin sheet 107 that exits a die 106 and is drawn into a quench tank 130 filled with a liquid 406, such as water. The figure illustrates the predetermined distance or spacing 402 that exists between the die 106 and surface of the water 406. It is in this distance that bubbles form and begin to grow.

Figure 5:
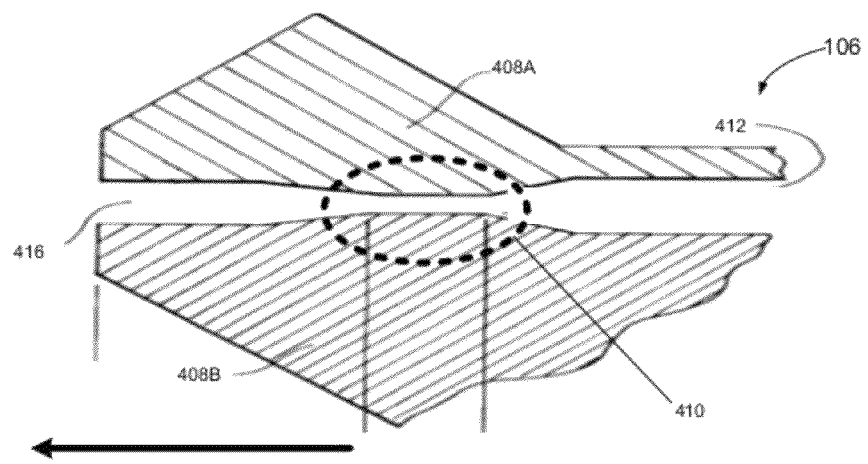
FIG. 5 illustrates a fragmentary, enlarged sectional view of an exemplary sheet extrusion die that may be used in the system of FIGS. 1A and 1B according to one exemplary embodiment of the invention.

Referring now to FIG. 5, this figure illustrates a fragmentary, enlarged sectional view of an exemplary sheet extrusion die 106 that may be used in the system 100. This die 106 includes an area 410, referred to as a die land, within a lip that allows expansion of the foamed resin mixture before it leaves the die at an exit 416. The die land 410 creates a narrow gap through which the gas saturated resin 107D must flow to exit the die. The die entrance 412 is usually coupled or is positioned adjacent to the exit of the melt pump 104.

With this die 106, combined with the predetermined spacing or distance 402 between the die exit 416 and cooling device 109, 130, the time in which bubbles of the extruded resin are allowed to nucleate and grow in the extruded resin is increased. This die 106 illustrated in FIG. 5 has an entrance 412 formed by a first half 408A of the die 106 and a second half 408B of the die 106.

Figure 6:
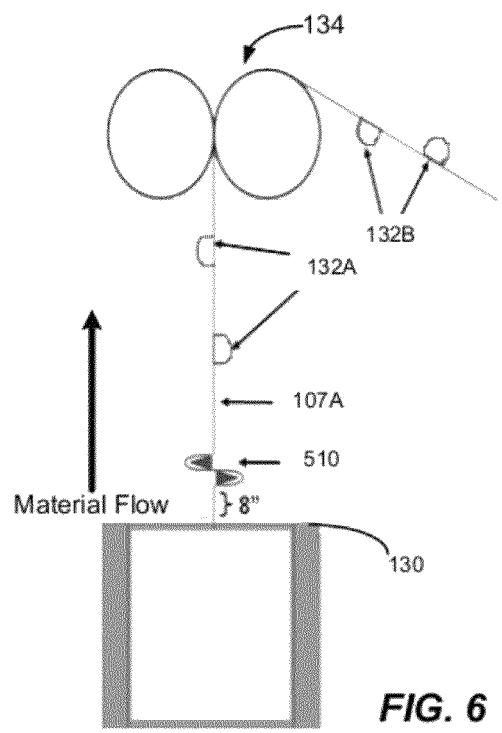
FIG. 6 is a schematic which illustrates an exemplary arrangement of vacuum devices, a Z-bar, and nip rolls that may be used for remove liquid from a quenched resin sheet according to one exemplary embodiment of the invention.
Figure 7:
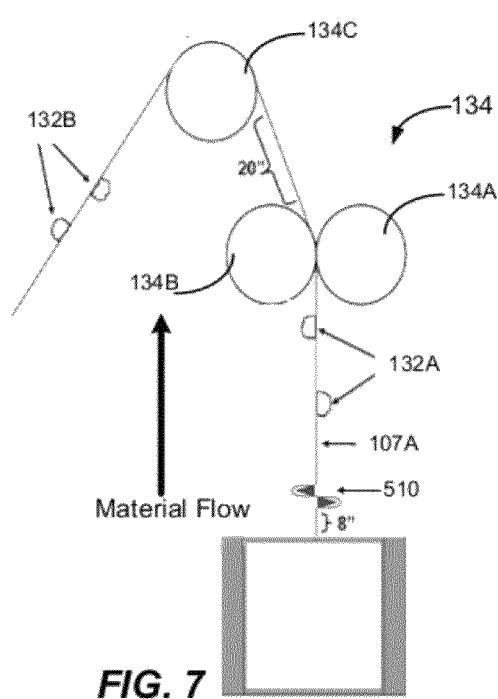
FIG. 7 is a schematic which illustrates a different arrangement of vacuum devices, a Z-bar, and nip rolls that may be used for remove liquid from a quenched resin sheet according to one exemplary embodiment of the invention.
Figure 8:
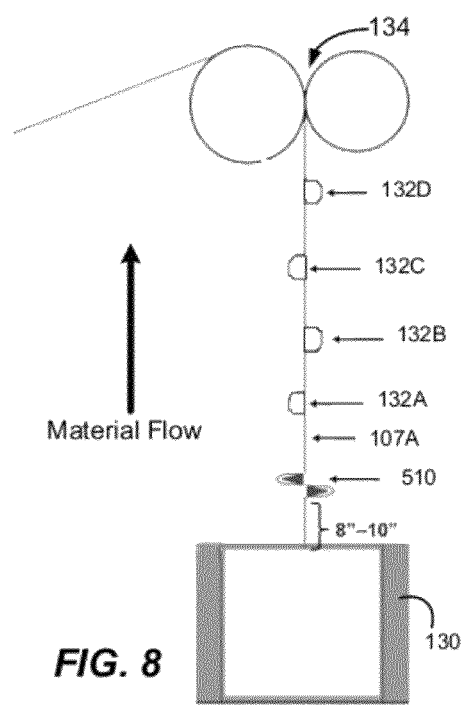
FIG. 8 is a schematic which illustrates still another arrangement of vacuum devices, a Z-bar, and nip rolls that may be used for remove liquid from a quenched resin sheet according to one exemplary embodiment of the invention.

Referring now to FIGS. 6-8, these figures show schematics which illustrate different arrangements of vacuum devices 132, Z-bars 510, and nip rolls 134 that may be used for removing liquid from the quenched sheet 107A and pulling the sheet 107A from the quench bath 130. FIG. 6 illustrates two vacuum devices 132A before and two vacuum devices 1328 after the nip tower 134. Prior to the first two vacuum devices a Z-bar 510 can be positioned. The Z-bar 510 can be spaced at about eight inches from the liquid level of the quench tank 130. However, other distances shorter or longer than those described are within the scope of the invention. In addition, it is not essential that a Z-bar be used.

Referring now to FIG. 7, in this figure a schematic is provided which illustrates various orientations of a Z-bar 510, vacuum devices 132, and a nip tower 134 relative to the extruded foamed resin sheet 107A. In this exemplary embodiment, a supplemental turning roll 134C is positioned above the nip tower 134 and prior to the final two vacuum devices 132B that contact the extruded foamed sheet 107A.

Referring now to FIG. 8, in this figure a schematic is provided which illustrates various orientations of a Z-bar 510, vacuum devices 132, and a nip tower 134 relative to the extruded foamed resin sheet 107A. In FIG. 8, several vacuum devices 132A through 132D and a Z-bar may be positioned prior to the nip tower 134. In this exemplary embodiment, there are no vacuum devices 132 positioned after the nip tower 134. However, one of ordinary skill in the art recognizes that additional vacuum devices 132 could be added to the exemplary embodiment illustrated in FIG. 8 without departing from the invention. Also in FIG. 8, the Z-bar 510 placed prior to the several vacuum devices 132 can be spaced about eight inches to about ten inches above the level of liquid 406 in the quench tank 130. However, other distances shorter or longer than those described are within the scope of the invention.

Figure 9:
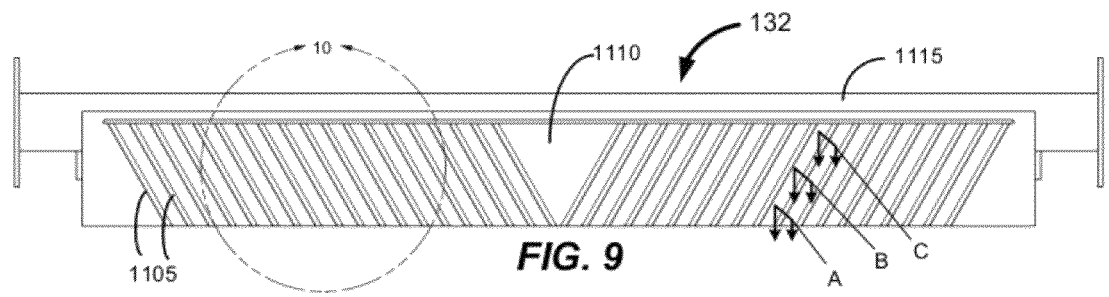
FIG. 9 illustrates a plan view of a vacuum device according to one exemplary embodiment of the invention.

Referring now to FIG. 9, this figure illustrates a plan view of a vacuum device 132 according to one exemplary embodiment of the inventive system. According to this exemplary embodiment, the vacuum device 132 has a diverging array of grooves 1105 forming vacuum slots within a plate 1110 that spread the foamed extruded resin sheet 107A evenly across the vacuum slots of the device 132. The vacuum device 132 may have a main vacuum conduit 1115 that supplies the suction for the groove 1105.

Figure 9C:
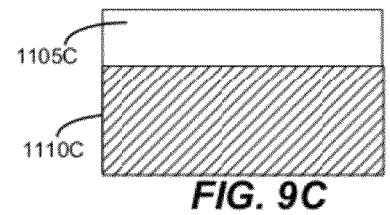
FIG. 9C illustrates a cut-away view of a third depth taken along a single tapered slot of the exemplary vacuum device illustrated in FIG. 9 according to one exemplary embodiment of the invention.
Figure 9D:
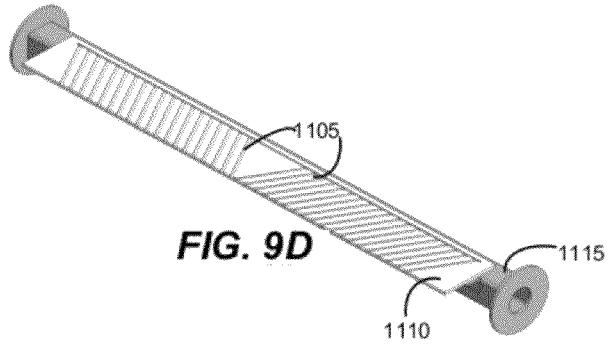
FIG. 9D illustrates an isometric view of the vacuum device of FIG. 9 according to one exemplary embodiment of the invention.
Figure 9B:
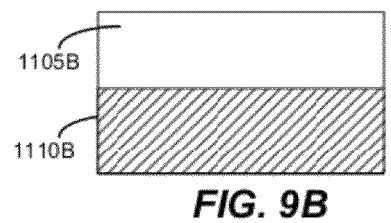
FIG. 9B illustrates a cut-away view of a second depth taken along a single tapered slot of the exemplary vacuum device illustrated in FIG. 9 according to one exemplary embodiment of the invention.
Figure 9A:
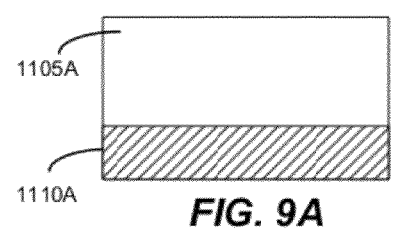
FIG. 9A illustrates a cut-away view of a first depth taken along a single tapered slot of the exemplary vacuum device illustrated in FIG. 9 according to one exemplary embodiment of the invention.

FIGS. 9A-9C illustrate cut away views taken along a single tapered slot 1105 that is present in the exemplary vacuum device 132 illustrated in FIG. 9. These cut away views in FIGS. 9A-9C illustrate an exemplary degree and progression of the taper or angle of the tapered slots 1105 in the vacuum device 132. The tapering cross-section of the slots 1105 of FIGS. 9A-9C can accelerate the air stream and can allow the vacuum device 132 to wipe away more moisture compared to slots of conventional vacuum devices which do not have any tapered shape to them. FIGS. 9A-9C illustrate the change in area by depth.

Specifically, FIG. 9A illustrates the initial depth of the slot 1105 having a depth of about 0.25 of an inch. FIG. 9B illustrates an intermediate depth of a slot 1105 having a depth less than about 0.25 of an inch but greater than 0.0064 of an inch. FIG. 9C illustrates a final depth of a slot 1105 having a depth of about 0.0064 of an inch, assuming that FIG. 9C illustrates the very last portion of a slot 1105. The cross-sectional shape of a slot 1105 can be U-shaped but other geometrical shapes, such as rectangular, oval, and other like shapes are within the scope of the invention.

Referring now to FIG. 9D, this figure illustrates another view of the vacuum device in FIG. 9. Specifically, FIG. 9D illustrates an isometric view of a vacuum device 132 of FIG. 9 according to an exemplary embodiment of the inventive system. FIG. 9D illustrates slots 1105 that start at the leading edge with a depth of about 0.25 of an inch and progressively become more shallow until they reach a threshold depth within the plate 1110, which has been determined to be a depth of about a 0.064 inch. Other starting and ending depths for each of the slots 1105 of the exemplary vacuum device 132 are not beyond the scope and spirit of the invention.

Figure 10:
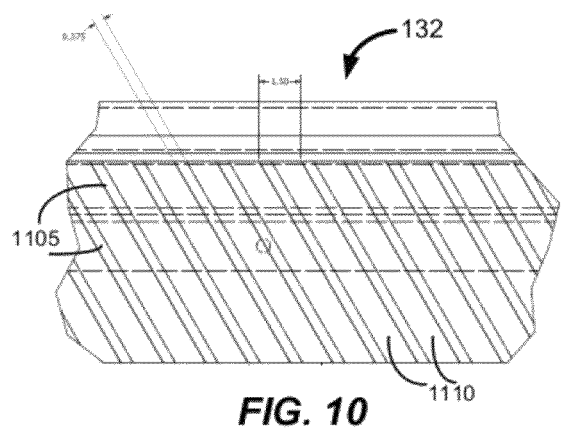
FIG. 10 illustrates how each of the slots of the exemplary vacuum device of FIG. 9 is parallel with one another according to one exemplary embodiment of the invention.

FIG. 10 illustrates some details of the grooves 1105 in FIGS. 9 and 9D. One of ordinary skill in the art recognizes that non-parallel slots 1105 (not shown) could be employed and would not depart from the invention.

Referring now to FIG. 11A, this figure illustrates an isometric view of a vacuum device 132 prime (') according to an exemplary embodiment of the inventive system. Referring to FIG. 11B, this figure illustrates a plan view of the vacuum device 132' illustrated in FIG. 11A. FIG. 11C illustrates a cross-sectional view of the inventive vacuum device 132' taken along the line C-C of FIG. 11B. FIG. 11D illustrates a cross-sectional view of the inventive vacuum device 132' taken along the line D-D of FIG. 11B. FIG. 11E illustrates a cross-sectional view of the inventive vacuum device 132 taken along the line E-E of FIG. 11B. FIG. 11F illustrates a sectional view of the vacuum device 132' illustrated circle 11F of FIG. 11B. FIG. 11G illustrates a sectional view of the vacuum device 132' within circle 11G of FIG. 11B.

The grooves 1105 illustrated in FIG. 11 have a decreasing depth starting from the entrance of each groove 1105 and eventually connect to a single groove 1402 positioned in the plate 1110 that interconnects all of the angled grooves 1105. The difference between the dimensions of the grooves 1105 can be as follows: width × depth—6.0 mm×9.0 mm at the inlet; 6.0 mm×6.0 mm in the middle of the groove 1105; and 6.0 mm×3.0 mm at the exit which leads to the groove 1402 that interconnects all of the grooves 1105. The spacing between parallel grooves 1105 can be approximately 35 mm. However, other dimensions for the spacing, width, and depth of the grooves 1105 are not beyond the scope of the invention.

One difference between the vacuum device 132 prime (') of FIG. 11 and the vacuum device 132 of FIG. 9 is that the vacuum device 132 prime (') has additional grooves 1105 near a central portion of the plate 1110 forming complete V-shapes as illustrated in FIGS. 11A, 11B, and 11F. In contrast, the plate 1110 of the vacuum device 132 of FIG. 9 does not have two V-shape grooves in the central region that connect within the face of plate 1110: instead, the central region of plate 1110 of FIG. 9 has only one V-shape groove.

FIG. 11F illustrates the detail of the circular section view 11F of FIG. 11B. FIG. 11G illustrates the detail of the circular section view 11G of FIG. 11B which illustrates how the central groove 1402 intersects with each groove 1105 at the end of plate 1110.

Referring now to FIG. 12, this figure illustrates a side sectional view of a vacuum device 132 of FIGS. 9-11 according to one exemplary embodiment of the inventive system. In this figure, movement of the extruded foamed resin sheet 107A is from right to left across the top of the device 132. The arrows also illustrate the direction of flow of air and entrained liquid from the extruded foamed sheet 107A when the vacuum device 132 is in operation. Air and entrained liquid enter each groove or slot 1105 and then progress to the main or connecting groove 1402, which transects the complete thickness of the sheet and connects to vacuum conduit 1115.

Referring now to FIG. 13, this Figure illustrates an isometric view of a vacuum device 132 double prime (") according to an alternative exemplary embodiment of the inventive system. FIG. 13 illustrates a different orientation of the taper for each slot 1105. In this exemplary embodiment, a change in area is achieved by a taper in the width dimension W of a slot 1105 instead of a tapered depth as set forth in the embodiments of FIGS. 9-11.

Referring now to FIG. 13A, this figure illustrates a sectional view of a vacuum device 132 double prime (") that contacts the extruded foamed sheet 107A. FIG. 13B illustrates a top view of the tapered width slots 1105 of FIG. 13A.

Figure 14:
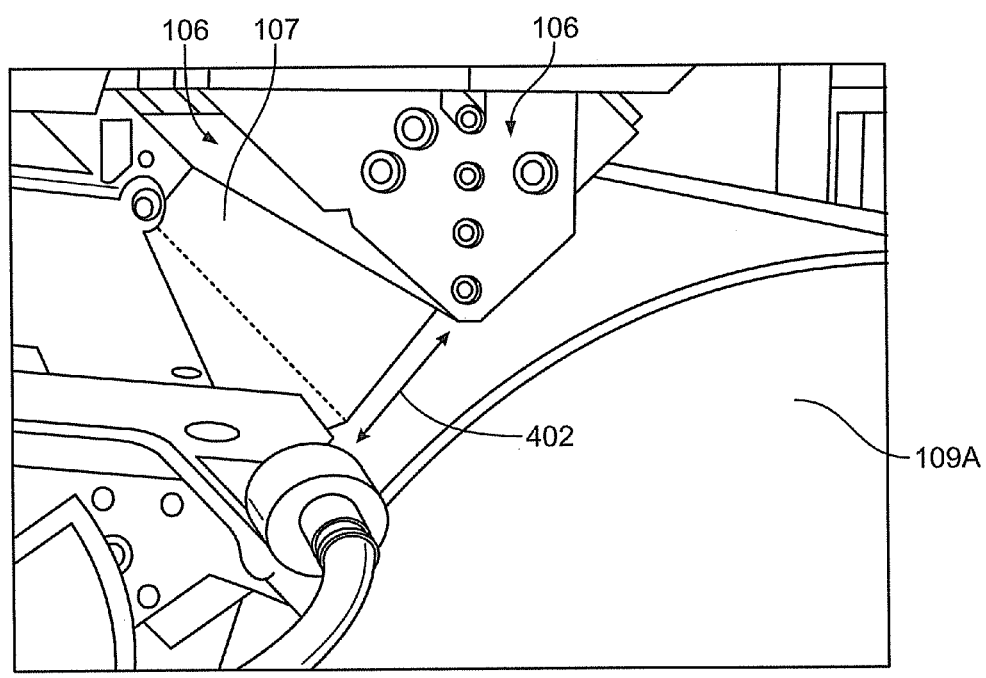
FIG. 14 illustrates an extruded foamed resin sheet exiting a die and being fed against a primary chill roll according to one exemplary embodiment of the invention.

Referring now to FIG. 14, this figure illustrates an extruded foamed resin sheet 107A exiting a die 106 and being fed against a primary chill roll 109A according to one exemplary embodiment of the inventive system.

Figure 15:
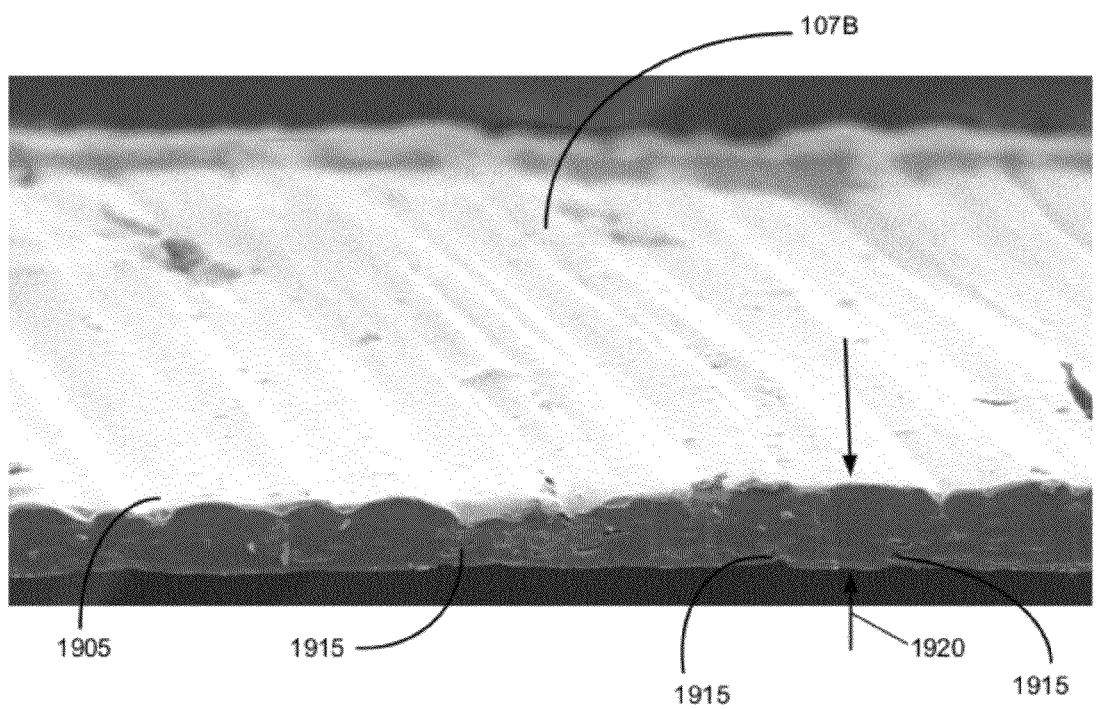
FIG. 15 is a photograph produced by a scanning electron microscope of the cross section and one surface of a representative tape yarn produced by the system according to one exemplary embodiment of the invention.

Referring now to FIG. 15, this figure is a photograph produced by a scanning electron microscope of the cross-section and top surface 1905 of a representative oriented, foamed polypropylene tape yarn 107B. The density of this tape yarn 107B illustrated in FIG. 15 is approximately 0.84 g/cc. The tape yarn 107B illustrated is shown with a thickness dimension 1920. The thickness is the maximum separation between parallel plates that contact each surface of the foamed sheet or tape.

Referring now to FIGS. 16-19, these figures illustrate various cross-sectional views of different representative foamed, oriented tapes 107B when viewed with a scanning electron microscope. The density found for all of these representative samples was approximately 0.81 g/cc. Voided areas 1915 within the tapes are irregular in shape and not distributed uniformly. The total void content calculated for each of these tapes 107B was approximately 11.0%. The term "Voided areas" used in this description means selected regions or spaces in tapes where voids exists. The term "Void content" used in this description means the total percentage of voids that may be present in an entire tape.

The tapes produced by the inventive process are primarily closed cell foams. The ridged surfaces result from bubbles that expand against ambient air or a liquid cooling medium 406. The polypropylene foamed oriented tapes of this invention have densities of about 0.78 to about 0.88 g/cc, consistent with internal void contents of about 2.0 to about 15.0%, respectively. One important characteristic of the tapes is that at least one surface has a plurality of longitudinal ridges that result from expansion of gaseous decomposition products from the blowing agent. The ridges lead to artificially high thickness measurements when the tapes are measured between two flat surfaces, as according to test method ASTM D3218. For example, typical measured thickness for a 676 denier, 89 mil wide polypropylene tape made by the system and method of this invention is about 1.9 mils. If a polypropylene tape with the same width and denier were rectangular in cross section and void free, the thickness would be only 1.45 mils. This value for thickness is calculated from the formula for polypropylene tapes:

$$\text{Thickness(mils)} = \text{denier} \times [1/\text{width(mils)}] \times (0.190)$$

For the oriented tapes made by the system and method of this invention, an apparent thickness as measured by ASTM D3218 is at least about 15.0% more than would be calculated for a void-free, rectangular cross section tape of the same denier and width.

TABLE 1

| Tape Properties Definitions | | |
|---|---|---|
| Property | Definition | Customary Units |
| Denier | The weight per unit length | none (grams per 9000 meters) |
| Tensile Strength | The force to break the tape | lbs |
| Elongation at Break | The extension at which the tape breaks | % |
| Shrinkage | The contraction following heating at 270° F. for a fixed time period | % |

Example 1

Approximate Speed of about 1000 fpm for Producing Warp Yarn

A 4.5-inch single-screw extruder with a 28:1 L/D was charged with about 97.9 parts by weight of a polypropylene homopolymer resin with a MFR of about 3.5, about 1.6 parts of a beige pigment masterbatch (SCC 16234 for Standridge Color Corp). and about 1.5 parts of a chemical blowing agent masterbatch (Hydrocerol® 3034 from Clariant Masterbatch GmbH). The blowing agent masterbatch was about 16% active and based on a citric acid/bicarbonate mixture. The temperatures of extruder barrel zones increased from about 394° F. to about 464° F. progressively from the throat to the discharge port. The molten mixture was discharged under pressure into a transfer tube attached to four spinning heads, each of which contained a melt pump and a circular spinneret with 90 rectangular holes. The temperatures in the transfer tube, individual melt pumps on each spinning head, and each spinning head were maintained in the range of about 420 to about 450° F.

The pressure in the system was about 4000 psi at the end of the extruder, about 1600 psi at the inlet to the melt pumps, and about 2600 psi in the spin packs. The rectangular monofilaments that were extruded from each pack were quenched in a water bath, drawn sequentially about 4.5× in a three-stage process, and then allowed to relax to about 9% over rolls heated to about 250° F. The air gap was about 1 inch, and the residence time of the extruded filaments in the gap was about 0.03 seconds. The oriented, annealed yarns were taken up on a bobbin at a speed of about 1000 fpm. The melt pumps were adjusted so that the final yarn denier was about 337. The yarn had dimensions of about 1.8 mils by about 54 mils and was translucent due to internal voids. The properties of the oriented foamed tape were tenacity: about 4.8 g/den, elongation at break: about 31.0%, and shrinkage after 20 min at 270° F.: about 5.9%.

Example 2

Approximate Speed of about 875 fpm for Producing Fill Yarn

A 6-inch single-screw extruder with a 28:1 L/D was charged with about 97.1 parts by weight of a polypropylene homopolymer resin with a MFR of about 3.5, about 1.6 parts of a beige pigment masterbatch (SCC 16234 for Standridge Color Corp) and about 1.3 parts of a chemical blowing agent masterbatch (Hydrocerol® 3034 from Clariant USA). The blowing agent masterbatch was about 16% active and based on a citric acid/bicarbonate mixture. The temperatures of extruder barrel zones were about 420° F. in the first zone and about 441 to about 464° F. in barrel zones 2 through 6. The molten mixture was discharged at a temperature of about 450° F. under pressure into a transfer tube attached to a melt filter, melt pump and an 80-inch wide coathanger film die. The temperatures in the transfer tube, melt pump and die were maintained at about 450° F.

The pressure was about 3300 psi at the end of the extruder, about 2000 psi at the inlet to the melt pump, and about 2400 psi in the die. The sheet that was extruded from the die through an air gap of 1.6 inches was quenched in a water bath at 80° F., vacuumed to remove excess moisture, and slit into tapes drawn about 5.8× in a forced air oven maintained at about 365° F. The exposure time of the extruded sheet in the air gap was about 0.05 seconds.

The foamed oriented tapes were allowed to contract about 14% over a series of six variable speed rolls heated to about 335° F. The oriented, annealed yarns were taken up on individual bobbins at a speed of about 875 fpm. The melt pump and slitter bar spacing were adjusted so that the final yarn denier was about 663. The yarn had dimensions of about 2.1 mils by about 79 mils and was translucent due to internal voids. The average properties for six packages selected at random were tenacity: 4.0 g/den, elongation at break: 37%, and shrinkage after 20 min at 270° F.: 1.2%. Foamed oriented tape samples from 12 separate bobbins had an average density of 0.84 g/cc, indicating an internal void content of about 7.1%. Density was determined by the float/sink method by immersion of tape samples in liquids of known density.

Example 3

Approximate Speed of about 1054 fpm for Producing Fill Yarn

A 6-inch single-screw extruder with a 28:1 L/D was charged with about 96.7 parts by weight of a polypropylene homopolymer resin with a MFR of about 3.5, about 1.6 parts of a beige pigment masterbatch (SCC 16234 for Standridge Color Corp). and about 1.7 parts of a chemical blowing agent masterbatch (Hydrocerol® 8697 from Clariant USA). The blowing agent masterbatch was about 12% active and based on a citric acid/bicarbonate mixture. The temperatures of extruder barrel zones were about 374° F. in the first zone and about 423 to about 482° F. in barrel zones 2 through 6. The molten mixture was discharged at a temperature of about 430° F. under pressure into a transfer tube attached to a melt filter, melt pump, and an 80-inch wide coathanger film die. The temperatures in the transfer tube and melt pump were about 430° F., and the temperature of the die was about 415° F.

The pressure was about 2550 psi at the end of the extruder, about 1700 psi at the inlet to the melt pump, and about 1840 psi in the die. The sheet that was extruded from the die through an air gap of about 1.75 inches, was quenched in a water bath at about 78° F., vacuumed to remove excess moisture, slit into tapes, and drawn about 5.8× in a forced air oven maintained at about 360° F. The time in the air gap was about 0.05 seconds, and the speed of the driven roll on the nip tower was about 190 feet per min. The foamed oriented tapes were allowed to contract about 10.6% over a series of six variable speed rolls heated to about 343° F. The oriented, annealed yarns were taken up on individual bobbins at a speed of about 1054 fpm. The melt pump and slitter bar spacing were adjusted so that the final yarn denier was about 667. The yarn had dimensions of about 1.8 mils by about 88 mils and was translucent due to internal voids. The average properties for six packages selected at random were tenacity: 5.0 g/den, elongation at break: 27%, and shrinkage after 20 min at 270° F.: 2.4%.

Example 4

Approximate Speed of about 960 fpm, a Preferred Exemplary Embodiment for Producing Warp Yarn A 4.5-inch single-screw extruder with a 28:1 L/D was charged with about 97.8 parts by weight of polypropylene homopolymer resin with about a 3.5 MFR, about 1.3 parts of a beige pigment masterbatch (SCC 16234 from Standridge Color Corp). and about 0.9 parts of a chemical blowing agent masterbatch (Hydrocerol® 8697 from Clariant USA). The blowing agent masterbatch was about 20% active and based on a citric acid/bicarbonate mixture. The temperatures of extruder barrel zones were about 375° F. in the first zone and about 385 to about 508° F. in barrel zones 2 through 6. The molten mixture was discharged at a temperature of about 455° F. under pressure into a transfer tube attached to a melt filter, melt pump and 52-inch wide coathanger film die. The temperatures in the transfer tube and melt pump were about 435° F., and the temperature of the die was about 420° F.

The pressure was about 2875 psi at the end of the extruder, about 1800 psi at the inlet to the melt pump, and about 2330 psi in the die. The sheet that was extruded from the die through an air gap of about 1.75 inches was quenched in a water bath at about 78° F., vacuumed to remove excess moisture, slit into tapes, drawn about 5.7× in a forced air oven maintained at about 360° F. The time for the extruded resin in the air gap was about 0.05 sec. The foamed oriented tapes were allowed to contract about 10% over a series of six variable speed rolls heated to about 339° F. The oriented, annealed yarns were taken up on individual bobbins at a speed of about 960 fpm. The melt pump and slitter bar spacing were adjusted so that the final yarn denier was about 335. The yarn had dimensions of about 1.6 mils by about 49 mils and was translucent due to internal voids. The average properties for six packages selected at random were tenacity: about 4.3 g/den, elongation at break: about 25%, and shrinkage after 20 min at 270° F.: about 1.9%.

Example 5

Approximate Speed of about 869 fpm for Producing Fill Yarn

A six-inch diameter single-screw extruder was charged with 97.2 parts by weight of 3.3 MFR polypropylene homopolymer resin, 0.4 parts of a brown pigment masterbatch (Remafin AEV 70101 from Clariant Masterbatch GmbH, Germany.), 0.8 parts of a chemical blowing agent masterbatch (Hydrocerol® 3115 from Clariant Masterbatch GmbH), 0.6 parts of a processing aid masterbatch (CESA®—process 1175021 from Clariant Masterbatch GmbH) and 1.0 parts of a calcium carbonate concentrate (Omyalene 102 M from Omya AG, Switzerland). The blowing agent masterbatch was about 16% active and based on a citric acid/bicarbonate mixture. The temperatures of extruder barrel zones were 420° F. in the first zone and 441 to 464° F. in barrel zones 2 through 6. The molten mixture was discharged at a temperature of about 450° F. under pressure into a transfer tube attached to a melt filter, melt pump, and a 52-inch wide coathanger film die. The temperatures in the transfer tube, melt pump and die were maintained at about 450° F.

The pressure was about 1900 psi at the end of the extruder, about 1300 psi at the inlet to the melt pump, and about 2600 psi in the die. The sheet that was extruded from the die through an air gap of about 3.5 inches on to a chill roll at about 77° F. The speed of the chill roll was about 151 ft per min. The speed of the chill roll was about 7% slower than that of the first quad. The residence time of the extruded foamable resin in the air gap was about 0.12 sec. After the sheet was slit into tapes, the tapes were drawn 5.6× between the first and second quads in a forced air oven maintained at 345° F. Then, the foamed oriented tapes were allowed to contract about 10% over a series of three variable speed rolls heated to about 335° F. The oriented, annealed yarns were taken up on individual bobbins at a speed of 869 fpm. The melt pump and slitter bar spacing were adjusted so that the final yarn denier was 665. The yarn was 92 mils wide and 1.8 mils thick. Other properties of the foamed, oriented yarn were tenacity: 4.2 g/den, elongation: 25%, and shrinkage: 1.7% at 270° F. after 5 min.

Example 6

Approximate Speed of about 900 fpm, Preferred Exemplary Embodiment for Producing Fill Yarn A 6-inch single-screw extruder with a 28:1 L/D was charged with about 96.7 parts by weight of a polypropylene homopolymer resin with a MFR of about 3.5, about 1.6 parts of a beige pigment masterbatch (SCC 16234 for Standridge Color Corp). and about 1.7 parts of a chemical blowing agent masterbatch (Hydrocerol® 8697 from Clariant USA). The blowing agent masterbatch was about 12% active and based on a citric acid/bicarbonate mixture. The temperatures of extruder barrel zones were about 380° F. in the first zone and about 420 to about 480° F. in barrel zones 2 through 6. The molten mixture was discharged at a temperature of about 445° F. under pressure into a transfer tube attached to a melt filter, melt pump, and an 80-inch wide coathanger film die. The temperatures in the transfer tube and melt pump were about 440° F., and the temperature of the die was about 430° F.

The pressure was about 2400 psi at the end of the extruder, about 1650 psi at the inlet to the melt pump, and about 2100 psi in the die. The sheet that was extruded from the die through an air gap of about 2.5 inches, was quenched in a water bath at about 82° F., vacuumed to remove excess moisture, slit into tapes, drawn about 5.8× in a forced air oven maintained at about 368° F. The time in the air gap was about 0.06 seconds, and the speed of the driven roll on the nip tower was about 161 feet per min. The foamed oriented tapes were allowed to contract about 9.8% over a series of six variable speed rolls heated to about 340° F. The oriented, annealed yarns were taken up on individual bobbins at a speed of about 900 fpm. The melt pump and slitter bar spacing were adjusted so that the final yarn denier was about 667. The yarn had dimensions of about 1.8 mils by about 88 mils and was translucent due to internal voids. The average properties for six packages selected at random were tenacity: 5.0 g/den, elongation at break: 26%, and shrinkage after 20 min at 270° F.: 1.8%.

Alternative embodiments of the inventive method and system will become apparent to one of ordinary skill in the art to which the present invention pertains without departing from its spirit and scope. Thus, although this invention has been described in exemplary form with a certain degree of particularity, it should be understood that the present disclosure has been made only by way of example and that numerous changes in the details of construction and the combination and arrangement of equipment, parts or steps may be resorted to without departing from the spirit or scope of the invention.

What is claimed is:

1. A method for manufacturing foamed polyolefin tapes comprising:
    combining a polyolefin resin and a blowing agent to form a mixture;
    heating and shearing the mixture in an extruder to create a supersaturated solution of gas within the polyolefin resin;
    maintaining a pressure within the extruder and a die that keeps gas dissolved within the polyolefin resin;
    feeding the polyolefin resin to the die;
    positioning a cooling device at a predetermined distance from an outlet of the die;
    extruding the gas-saturated polyolefin resin solution through the die;
    exposing the extruded resin to atmospheric pressure for a predetermined amount of time based on the predetermined distance between the cooling device and the outlet of the die to form a foamed resin;
    cooling the foamed resin with the cooling device to form a foamed polyolefin resin sheet;
    removing the foamed polyolefin resin sheet from the cooling device;
    slitting the drawn foamed polyolefin sheet into tapes;
    orienting the tapes from about 4 to about 8 times their original length; and
    maintaining line speeds for the tapes at or in excess of 850 feet per minute, wherein the maximum thickness of the foamed oriented polyolefin tape comprises 4 mils.

2. The method of claim 1, wherein the blowing agent comprises one of a bicarbonate agent and a citric acid agent.

3. The method of claim 1, wherein the foamed oriented tape has an apparent thickness measured according to ASTM D3218 that is at least 15% greater than the calculated thickness of a void-free, rectangular cross section tape of the same denier and width.

4. The method of claim 1, wherein the foamed, oriented tape has multiple longitudinal ridges due to the expansion of bubbles formed within the tape.

5. The method of claim 1, wherein the blowing agent masterbatch is supplied in an amount of about 0.3 to about 3.0 percent by weight of the mixture.

6. The method of claim 1, wherein the blowing agent comprises a citric acid ester.

7. The method of claim 1, wherein the blowing agent comprises at least one of calcium oxide and calcium carbonate.

8. The method of claim 1, wherein the blowing agent comprises a bubble nucleator.

9. The method of claim 8, wherein the bubble nucleator comprises uncoated talc.

10. The method of claim 1, wherein the blowing agent comprises at least one of an azo compound, a diazo compound, an N-Nitroso compound, a sulfonylhydrazide, an azodicarbonamide, sodium bicarbonate, and citric acid.

11. The method of claim 1, wherein the cooling device comprises a chill roll, and the predetermined distance between the cooling device and the outlet of the die is between about 2.0 to about 6.0 inches.

12. The method of claim 1, wherein the cooling device comprises a liquid of a quench tank, and the predetermined distance between the cooling device and the outlet of the die is between about 0.2 to about 6 inches.

13. The method of claim 1, wherein exposing the extruded resin to atmospheric pressure for a predetermined amount of time comprises exposing the extruded resin to atmospheric pressure for at least about 0.02 seconds.

14. The method of claim 1, wherein the polyolefin resin comprises at least one of polypropylene homopolymer, high density polyethylene, linear low density polyethylene, and metallocene polyethylene.

15. The method of claim 1, wherein the polyolefin resin comprises polypropylene having a melt flow rate from about 0.2 to about 25 g/10 minutes determined according to ASTM D1238 at 230° C. and 2.16 kg.

16. The method of claim 1, wherein the polyolefin resin comprises polyethylene having a melt index from about 0.1 to about 40 g/10 minutes determined according to ASTM 01238 at 190° C. and 2.16 kg.

17. A method for manufacturing foamed polyolefin tapes comprising:
   providing a mixture comprising a polyolefin resin and a blowing agent;
   heating and shearing the mixture in an extruder to create a supersaturated solution of gas within the polyolefin resin;
   maintaining a pressure within the extruder and a die that keeps gas dissolved within the polyolefin resin;
   feeding the polyolefin resin to the die;
   positioning a heat removal device at a predetermined distance from an outlet of the die;
   extruding the gas-saturated polyolefin resin solution through the die;
   exposing the extruded resin to atmospheric pressure for a predetermined amount of time based on the predetermined distance between the cooling device and the outlet of the die to form a foamed resin;
   removing heat from the foamed resin with the heat removal device to form a foamed polyolefin sheet;
   transferring the foamed polyolefin sheet away from the heat removal device;
   dividing the foamed polyolefin sheet into tapes;
   extending the tapes by a predetermined factor above their original length; and
   maintaining line speeds for the tapes at or in excess of 850 feet per minute, wherein the maximum thickness of the foamed oriented polyolefin tape comprises 4 mils.

18. The method of claim 17, wherein extending the tapes by a predetermined factor comprises orienting the tapes from about 4 to about 8 times their original length.

19. The method of claim 17, wherein exposing the extruded resin to atmospheric pressure for a predetermined amount of time comprises exposing the extruded resin to atmospheric pressure for at least about 0.02 seconds.

20. A method for manufacturing foamed polyolefin tapes comprising:
   heating and shearing a mixture comprising a polyolefin resin and a blowing agent in an extruder to create a supersaturated solution of gas within the polyolefin resin;
   maintaining a pressure within the extruder and a die that keeps gas dissolved within the polyolefin resin;
   feeding the polyolefin resin to the die;
   positioning a heat removal device at a predetermined distance from an outlet of the die;
   extruding the gas-saturated polyolefin resin through the die;
   exposing the extruded resin to atmospheric pressure for a predetermined amount of time based on the predetermined distance between the cooling device and the outlet of the die;
   removing heat from the foamed polyolefin resin with the heat removal device to form a foamed polyolefin resin sheet;
   transferring the foamed polyolefin resin sheet away from the heat removal device;
   dividing the drawn foamed polyolefin resin sheet into tapes;
   extending the tapes by a predetermined factor above their original length; and
   maintaining line speeds for the tapes at or in excess of 850 feet per minute wherein the maximum thickness of the foamed oriented polyolefin tape comprises 4 mils.

21. The method of claim 20, wherein the polyolefin resin comprises at least one of polypropylene homopolymer, high density polyethylene, linear low density polyethylene, and metallocene polyethylene.

22. The method of claim 20, wherein extruding the gas-saturated resin solution through the die comprises extruding the gas-saturated resin solution through a screen with a mesh size between about 150 and about 250.

23. The method of claim 20, wherein the resin mixture containing the blowing agent produces about 30 to about 60 cubic centimeters (cc) of gaseous decomposition products at standard temperature and pressure per 100 grams of resin mixture.

* * * * *